United States Patent
Kawate et al.

(10) Patent No.: US 7,657,154 B2
(45) Date of Patent: Feb. 2, 2010

(54) PROVIDING EDITED VIDEO DATA SUITABLE FOR EFFICIENT USE OF VIDEO REPRODUCING DEVICE CAPABILITIES

(75) Inventors: Fumitaka Kawate, Kanagawa (JP);
Makoto Yamada, Tokyo (JP);
Mitsuhiro Hirabayashi, Tokyo (JP);
Toshihiro Ishizaka, Kanagawa (JP)

(73) Assignee: Sony Corporation (JP)

( * ) Notice: Subject to any disclaimer, the term of this patent is extended or adjusted under 35 U.S.C. 154(b) by 1120 days.

(21) Appl. No.: 10/450,095

(22) PCT Filed: Oct. 10, 2002

(86) PCT No.: PCT/JP02/10555

§ 371 (c)(1),
(2), (4) Date: Nov. 10, 2003

(87) PCT Pub. No.: WO03/034721

PCT Pub. Date: Apr. 24, 2003

(65) Prior Publication Data

US 2004/0076400 A1    Apr. 22, 2004

(30) Foreign Application Priority Data

Oct. 12, 2001  (JP)  ............................. 2001-315855
Nov. 26, 2001  (JP)  ............................. 2001-359983

(51) Int. Cl.
*H04N 5/78* (2006.01)
(52) U.S. Cl. .................................................. 386/52
(58) Field of Classification Search ............... 386/52, 386/55; 348/578, 553, 558, 569
See application file for complete search history.

(56) References Cited

U.S. PATENT DOCUMENTS

| | | | |
|---|---|---|---|
| 4,205,344 A | | 5/1980 | Rayner |
| 5,568,275 A | * | 10/1996 | Norton et al. .................. 386/52 |
| 5,754,851 A | * | 5/1998 | Wissner .................... 707/104.1 |
| 5,835,769 A | * | 11/1998 | Jervis et al. .................. 717/113 |
| 6,016,380 A | * | 1/2000 | Norton ......................... 386/52 |
| 6,215,746 B1 | | 4/2001 | Ando et al. |
| 6,636,687 B1 | * | 10/2003 | Ando et al. .................... 386/55 |

FOREIGN PATENT DOCUMENTS

| | | | |
|---|---|---|---|
| EP | 0 863 510 | | 9/1998 |
| JP | 63-80326 | * | 4/1988 |
| JP | 9-34872 A1 | | 2/1997 |
| JP | 9-121303 A1 | | 5/1997 |
| JP | 2000-57746 A1 | | 2/2000 |

* cited by examiner

*Primary Examiner*—David E Harvey
(74) *Attorney, Agent, or Firm*—Lerner, David, Littenberg, Krumholz & Mentlik, LLP

(57) ABSTRACT

The present invention provides an editing apparatus, a reproducing apparatus, and a recording medium for reproducing special effects by full use of the capabilities of the reproducing apparatus. The editing apparatus having original video data and edited data that are a collection of editing codes for performing an editing operation with a desired editing type on a desired portion in the original video data to generate edited video data includes a primary conversion table attaching means for attaching, to the editing video data, a primary conversion table for correlating at least the desired editing type with a standard editing type specified as standard in advance.

2 Claims, 20 Drawing Sheets

F I G. 1
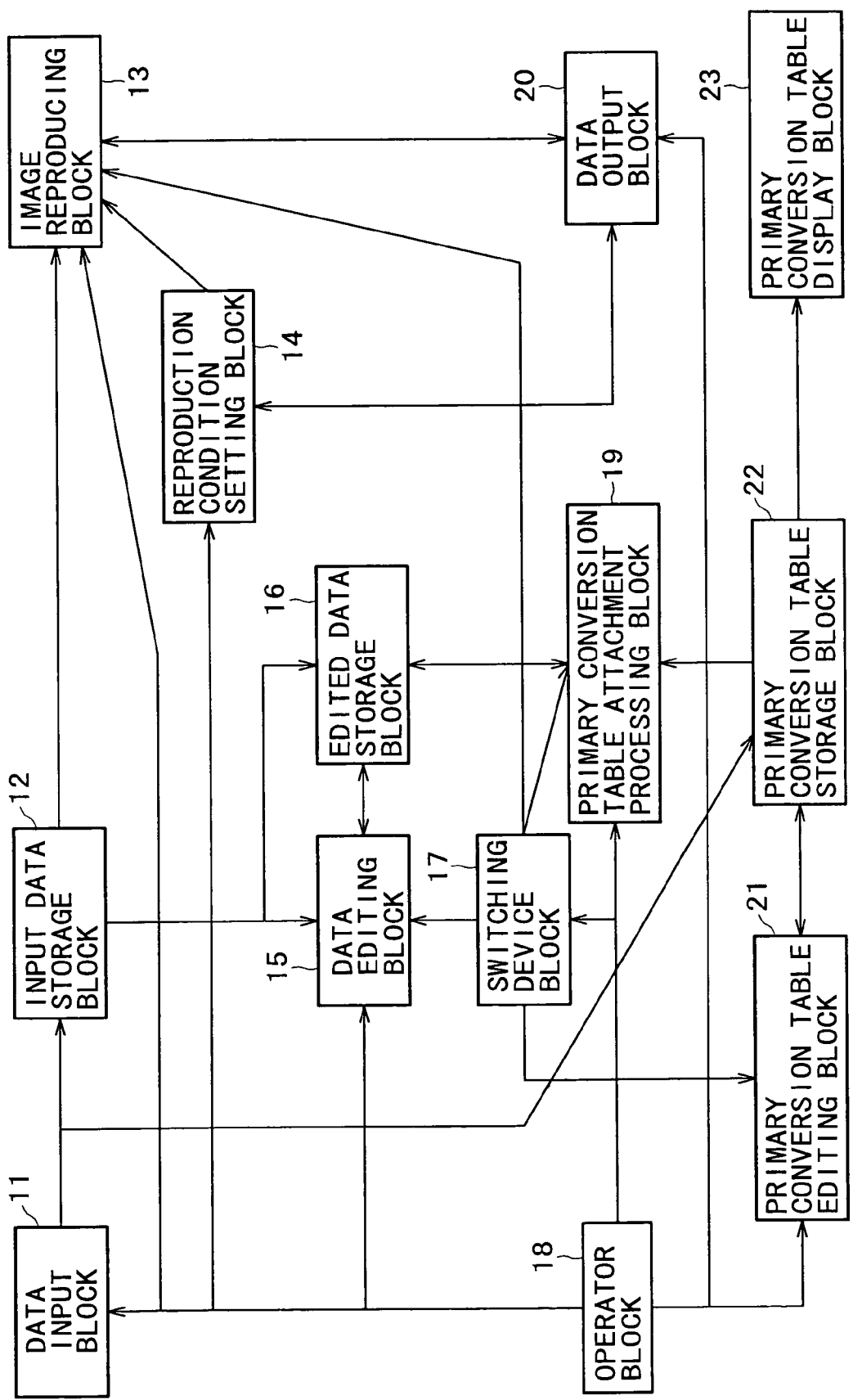

FIG. 2

| TYPE | TRANSITION TYPE | TRANSITION SUBTYPE | WIPE CODE |
|---|---|---|---|
| TRANSITION | BarWipe | LeftToRight | 1 |
| TRANSITION | BarWipe | TopToBottom | 2 |
| TRANSITION | BoxWipe | TopLeft | 3 |
| TRANSITION | BoxWipe | TopRight | 4 |
| TRANSITION | BoxWipe | BottomLeft | 5 |
| TRANSITION | BoxWipe | BottomRight | 6 |
| TRANSITION | IrisWipe | Rectangle | 101 |
| TRANSITION | IrisWipe | Diamond | 102 |

FIG. 3

| SPECIAL EFFECTS | ALTERNATIVES |
|---|---|
| BarWipe TopToBottom | BarWipe TopToBottom |
| BoxWipe TopLeft | BoxWipe TopLeft |
| BoxWipe TopRight | BoxWipe TopRight |
| BoxWipe TopCenter | BoxWipe TopLeft |
| BoxWipe BottomCenter | BoxWipe BottomRight |
| TriangleWipe Up | IrisWipe Rectangle |
| TriangleWipe Right | IrisWipe Diamond |
| TriangleWipe Left | IrisWipe Diamond |
| TriangleWipe Down | IrisWipe Diamond |
| ⋮ | ⋮ |

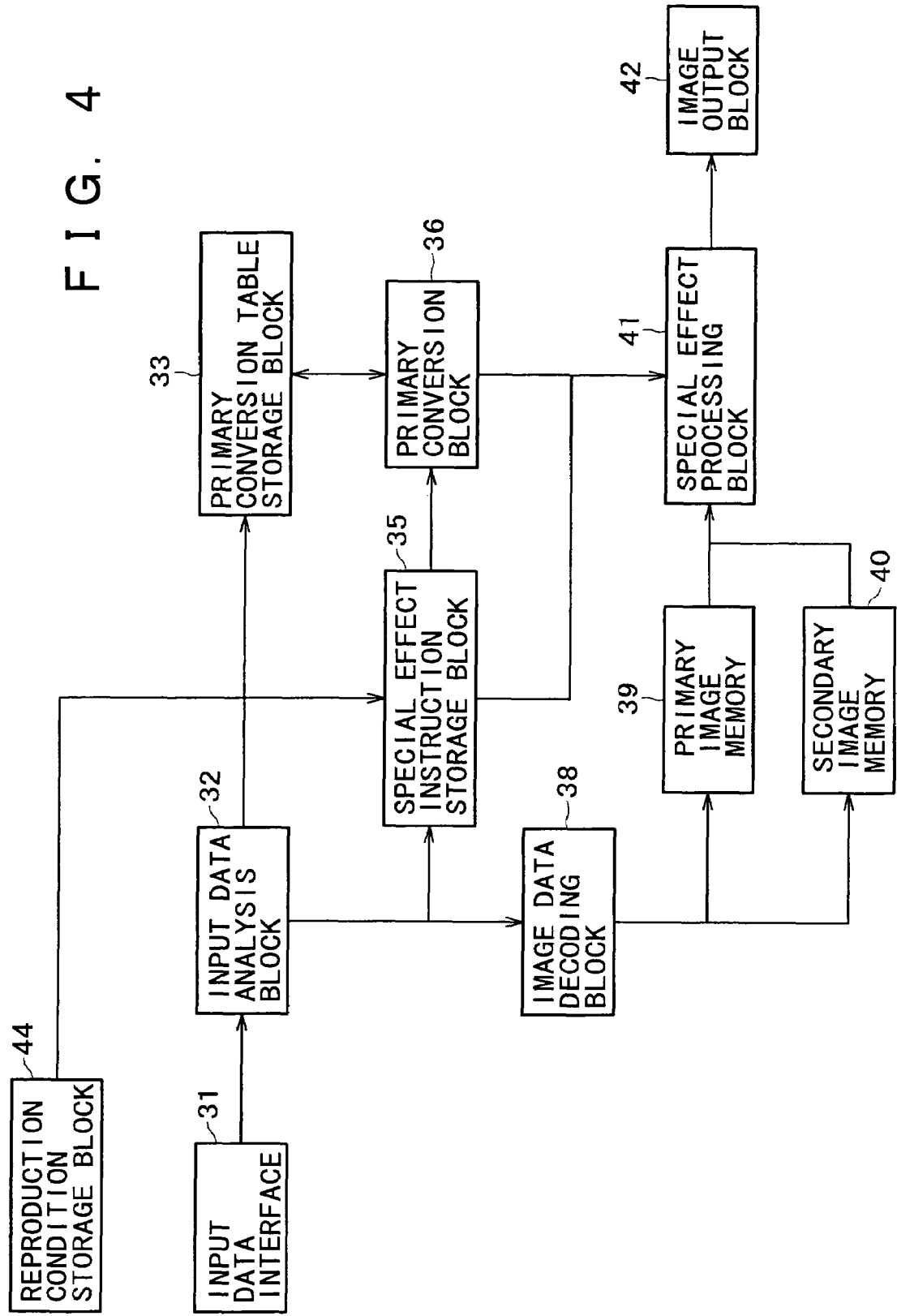

FIG. 14

| INPUT | INSTALL |
|---|---|
| BarWipe LeftToRight | BarWipe TopToBottom |
| BarWipe TopToBottom | BarWipe TopToBottom |
| BoxWipe TopLeft | BoxWipe TopLeft |
| BoxWipe TopRight | BoxWipe TopRight |
| BoxWipe BottomLeft | BoxWipe TopLeft |
| BoxWipe BottomRight | BoxWipe TopRight |
| IrisWipe Rectangle | IrisWipe Rectangle |
| IrisWipe Diamond | IrisWipe Rectangle |

F I G. 1 8

| SPECIAL EFFECTS | ALTERNATIVES |
|---|---|
| BarWipe TopToBottom | TYPE=BarWipe<br>SUBTYPE=TopToBottom |
| BoxWipe TopLeft | TYPE=BoxWipe<br>SUBTYPE=TopLeft |
| BoxWipe TopRight | TYPE=BoxWipe<br>SUBTYPE=TopRight |
| BoxWipe TopCenter | TYPE=BoxWipe<br>SUBTYPE=TopLeft |
| BoxWipe BottomCenter | TYPE=BoxWipe<br>SUBTYPE=BottomRight |
| TriangleWipe Up | TYPE=IrisWipe<br>SUBTYPE=Rectangle |
| TriangleWipe Right | TYPE=IrisWipe<br>SUBTYPE= − |
| TriangleWipe Left | TYPE=IrisWipe<br>SUBTYPE= − |
| TriangleWipe Down | TYPE=IrisWipe<br>SUBTYPE= − |
| ⋮ | ⋮ |

F I G. 1 9

| INPUT | | | | | INSTALL |
|---|---|---|---|---|---|
| SPECIAL EFFECTS | | | | | NoEffect |
| | TRANSITION | | | | BarWipe LeftToRight |
| | | Wipe | | | − |
| | | | EdgeWipe | | − |
| | | | | BarWipe | − |
| | | | | LeftToRight | BarWipe LeftToRight |
| | | | | TopToBottom | − |
| | | | BoxWipe | | BoxWipe TopLeft |
| | | | | TopLeft | BoxWipe TopLeft |
| | | | | TopRight | BoxWipe TopRight |
| | | | | BottomLeft | − |
| | | | | BottomRight | − |
| | | | IrisWipe | | CrossFade |
| | | | | IrisWipe | − |
| | | | | Rectangle | NoEffect |
| | | | | Diamond | − |
| | | CrossFade | | | CrossFade |
| | Filter | | | | NoEffect |
| | | Color Conversion | | | − |
| | | | GrayScale | | GrayScale |
| | | PictureQuality Conversion | | | − |
| | | | Sharpness | | NoEffect |

PROVIDING EDITED VIDEO DATA SUITABLE FOR EFFICIENT USE OF VIDEO REPRODUCING DEVICE CAPABILITIES

TECHNICAL FIELD

The present invention relates generally to an editing apparatus, a reproducing apparatus, and a recording medium, which are capable of reproducing special effects by fully using the capabilities of the reproducing apparatus.

BACKGROUND ART

In the production of video content, special effects are used in order to provide a plurality of pieces of information, produce variations in screen changeover, and protect privacy on the screen, for example. There are two methods in which these special effects are performed: in one method, a video signal on which special effects have been performed is recorded to a recording medium; and, in the other method, an original video signal is recorded without change while a special effect processing procedure is also recorded in which the recorded original video signal is processed in accordance with the recorded processing procedure at the time of reproduction, thereby reproducing the special effects. The latter is especially referred to as a nondestructive editing in which editing is performed by use of a software application such as QuickTime (hereafter referred to as QT). QT is a software program for managing various data along with the time axis and is an OS extended capability for reproducing and synchronizing moving image, sound, and text for example without use of special hardware.

In each QT file, the basic data unit is referred to as an atom, which includes its data, size, and type information. Further, in each QT file, the minimum unit of data is handled as a sample and a collection of samples is defined as a chunk. A resource atom is a part in which the information necessary for reproducing that file and the information necessary for referencing real data are stored. A data atom is a part in which real data such as video and audio data are stored. QT is disclosed in "INSIDE MACINTOSH: QuickTime (Japanese edition) Addison-Wesley" and other documents.

In the nondestructive editing based on QT, not only the special effects for images, but also the superimposition of characters and graphics may be described in a QT file format in a similar manner. To be more specific, types of special effects, start time, end time, and ID of video on which special effects are performed are recorded to a recording medium in the QT file format. At the time of reproduction, specified types of special effects are performed on the specified video at the specified time, the resultant video being displayed on a display device, thereby reproducing the video provided with the same special effects as those provided by an editor at the time of editing.

Because there are lots of special effects and character fonts, there arises a problem of the inconsistency in the types of installed special effects between the models of reproducing apparatuses. To be more specific, when a recording medium is reproduced by a certain model, video is reproduced with the special effects and character fonts intended by the editor; however, if this recording medium is reproduced by another model, there arises a problem that the video is not reproduced as intended by the editor. In addition, if the video is reproduced by models that cannot recognize the special effects and character fonts used in the video, there arises a problem that the video is reproduced without the special effects and character fonts provided on the video.

Especially, recently, video content is offered by means of various recording media including disk media such as LD, video CD, and DVD in addition to memory cards and network media, so that the problems of the inability of special effect and character font reproduction dependent on the models of reproducing devices are significant.

In order to solve the above-mentioned problems, it may be proposed that the special effects and character fonts be standardized and some of the effects and fonts be specified as essential items. In this approach, however, a problem is expected that, even if there are high-performance reproducing devices including special effects and character fonts other than the essential items, the video content edited by use of the essential items becomes commonplace, eventually losing the chance of using this high performance.

It may also be proposed that the editor performs the editing operation in consideration of some of the models so that the edited video content may be reproduced on particular different models respectively. In this approach, however, there are produced a plurality of edited video content for different models in spite of the same title, thereby pushing up the cost of distribution and delivery. It may also be expected that only the edited video content intended to the models having a large market share be brought on the market, other video content being ignored.

DISCLOSURE OF INVENTION

It is therefore an object of the present invention to provide an editing apparatus, a reproducing apparatus, and a recording medium, which are capable of reproducing special effects by fully using the capabilities of the reproducing apparatus.

In carrying out the invention and according to one aspect thereof, there is provided an editing apparatus having original video data and edited data that are a collection of editing codes for performing an editing operation with a desired editing type on a desired portion in the original video data to generate edited video data includes a primary conversion table attaching means for attaching, to the editing video data, a primary conversion table for correlating at least the desired editing type with a standard editing type specified as standard in advance.

In the above-mentioned editing apparatus, the edited video data are provided with a primary conversion table for converting editing codes into the type of standard editing standardized as a common standard, so that the original video data may be edited by use of various editing types regardless of the editing types installed in each reproducing apparatus, which reproduces the edited video data.

In addition, there is no need to create edited video data in accordance with the difference between the models of reproducing apparatuses. This significantly reduces the cost of distribution and delivery of edited video data.

In carrying out the invention and according to another aspect thereof, there is provided an reproducing apparatus for reading data from a recording medium recording original video data, edited data that are a collection of editing codes for performing editing with a desired editing type on a desired portion of the original video data, and a primary conversion table for correlating at least the editing type with a standard editing type specified as standard in advance, performing editing on the original video data, and reproducing the edited video data includes a primary conversion table storage means for storing the primary conversion table; a secondary conversion table storage means for storing a secondary conversion table that correlates the standard editing type with any of installed editing types; a primary converting means for converting the editing type of the editing codes into a standard editing type corresponding to the editing type of the editing codes as a primary-conversion editing type by referencing the primary conversion table stored in the primary conversion table storage means, if no editing type of the editing codes is installed; and a secondary converting means for converting the primary conversion editing type into an installed editing type as a secondary conversion editing type by referencing the secondary conversion table stored in the secondary conversion table storage means, if no primary conversion editing type obtained by the primary converting means is installed, wherein the original video data are edited and reproduced by use of one of the editing type of the editing codes, the primary conversion editing type, and the secondary conversion editing type in accordance with the installed editing type.

In carrying out the invention and according to still another aspect thereof, there is provided the reproducing apparatus mentioned above, wherein the secondary conversion table is created in a hierarchical manner in which the standard editing types are hierarchically classified based on the wideness of concept, and the second converting means secondary-converts the installed editing type by a primary conversion editing type on an upper layer of the primary conversion editing type, if there is no corresponding installed editing type in the secondary conversion table when secondary-converting the primary conversion editing.

In the above-mentioned reproducing apparatus, even if the editing types initially intended by the editor are not installed in the reproducing apparatus, these types may be converted into standard editing types by use of the primary conversion table. Further, even if the primary-converted standard editing types are not installed in the reproducing apparatus, these editing types may be secondary-converted into the installed editing types by use of the secondary conversion table. Hence, the installed editing types may be determined in a flexible manner without having to install not only any editing types but also any standard editing types.

In carrying out the invention and according to still another aspect thereof, there is provided a recording medium recording original video data, edited data, which are a collection of editing codes for performing editing with a desired editing type on a desired portion of the original video data, and a primary conversion table for correlating at least the desired editing type with a standard editing type specified as standard in advance.

BRIEF DESCRIPTION OF DRAWINGS

FIG. 1 is a block diagram illustrating an exemplary configuration of an editing apparatus associated with one embodiment of the invention;

FIG. 2 shows one example of a standard wipe operation;

FIG. 3 shows one example of a primary conversion table in a first embodiment of the invention;

FIG. 4 is a block diagram illustrating an exemplary configuration of an image reproducing block in the first embodiment;

FIG. 14 shows one example of a secondary conversion table associated with the first embodiment;

FIG. 18 shows one example of a primary conversion table having a hierarchical structure in the second embodiment;

FIG. 19 shows one example of a secondary conversion table having a hierarchical structure in the second embodiment.

BEST MODE FOR CARRYING OUT THE INVENTION

Figure 5:
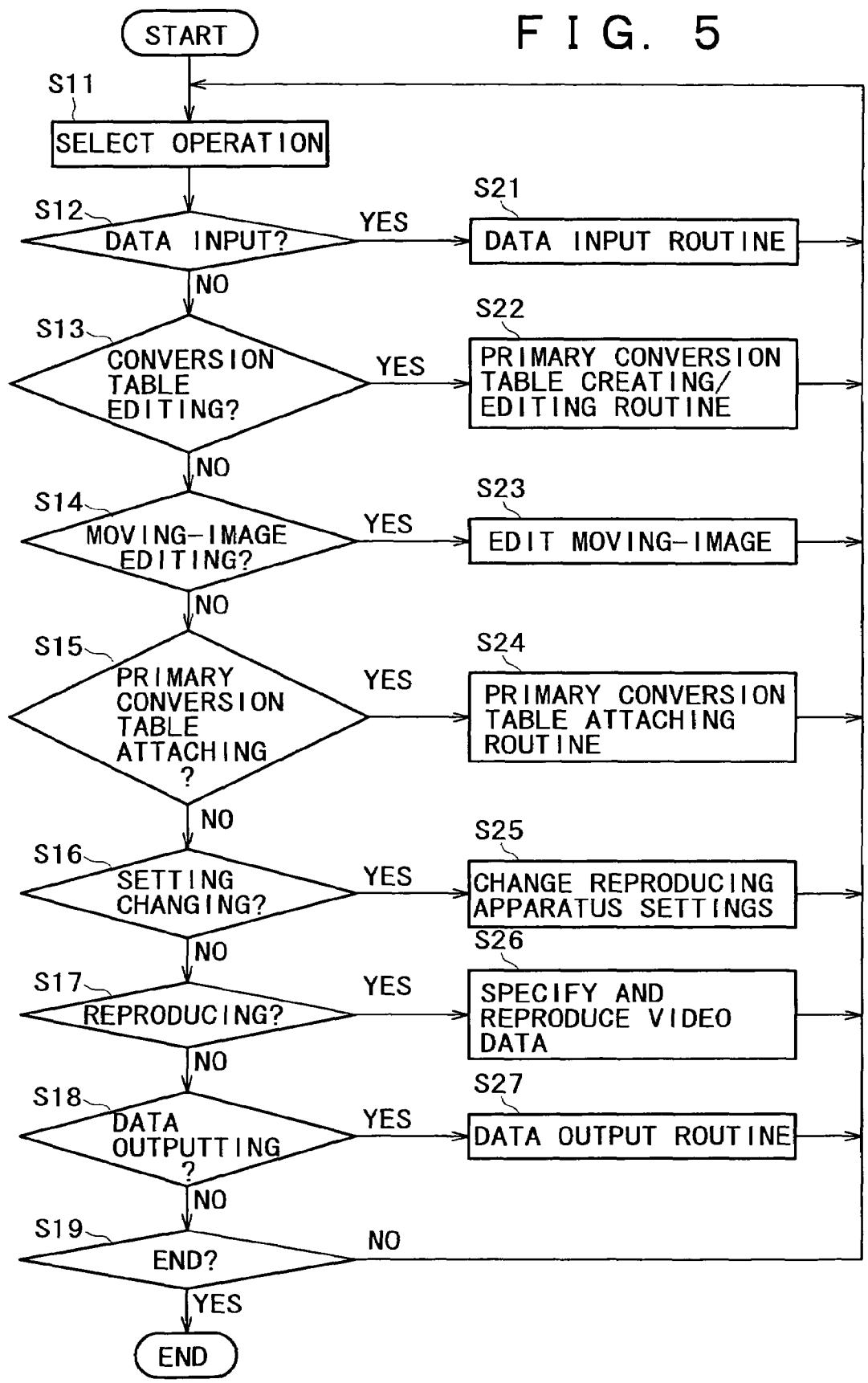
FIG. 5 is a flowchart describing operations of the editing apparatus in the first embodiment.

This invention will be described in further detail by way of example with reference to the accompanying drawings. It should be noted that, throughout these drawings, the similar components are denoted by the same reference numerals and their repetitive descriptions will be skipped.

First Embodiment

Referring to FIG. 1, there is shown a block diagram illustrating an exemplary configuration of an editing apparatus practiced as a first embodiment of the invention.

As shown in FIG. 1, the editing apparatus includes a data input block 11, a input data storage block 12, a reproduction condition setting block 14, a data editing block 15, an edited data storage block 16, a switching device block 17, an operator block 18, a primary conversion table attachment processing block 19, a data output block 20, a primary conversion table editing block 21, a primary conversion table storage block 22, and a primary conversion table display block 23.

The operator block 18 is operated by the user to enter desired operations; for example, this block is a user interface based on a mouse and a keyboard for example. The operator block 18 is connected to the data input block 11, the image reproducing block 13, the reproduction condition setting block 14, the data editing block 15, the switching device block 17, the primary conversion table attachment processing block 19, the data output block 20, and the primary conversion table editing block 21.

The switching device block 17 switches between the blocks to be operated through the operator block 18 and is connected to the image reproducing block 13, the data editing block 15, the primary conversion table attachment processing block 19, and the primary conversion table editing block 21.

The data input block 11 is a block through which data are entered from the outside and is connected to the input data storage block 12 and the primary conversion table storage block 22.

The input data storage block 12 is a storage means in which the input data are stored, for example a RAM (Random Access Memory), and has at least a storage size necessary for editing. For example, in performing a special effect for superimposing two images together, this storage means has at least a storage size necessary for storing the data of these two images. The input data storage block 12 is connected to the data editing block 15, the edited data storage block 16, and the image reproducing block 13.

The data editing block 15 performs various editing operations such as providing special effects on the image data stored in the input data storage block 12 or the image data stored in the edited data storage block 16. The data editing block 15 is connected to the edited data storage block 16.

The edited data storage block 16 is a storage means, a RAM for example, for storing edited results. The edited data storage block 16 is connected to the primary conversion table attachment processing block 19, the image reproducing block 13, and the data output block 20.

The primary conversion table editing block 21 creates a primary conversion table or changes its contents in accordance with an operation performed through the operator block 18 while accessing the data stored in the primary conversion table storage block 22. The primary conversion table editing block 21 is connected to the primary conversion table storage block 22.

The primary conversion table storage block 22 is a storage means, a RAM for example, for storing the primary conversion table. The primary conversion table storage block 22 is connected to the primary conversion table attachment processing block 19 and the primary conversion table display block 23.

The following describes the primary conversion table.

Referring to FIG. 2, there is shown one example of standard wipe operations.

Referring to FIG. 3, there is shown one example of the primary conversion table in the first embodiment of the invention.

The standard special effects denote the special effects standardized as the special effects specified by the editor of which types may be determined in each editing apparatus for performing special effects and each reproducing apparatus for reproducing the image data provided with special effects. Therefore, each editing apparatus may not always execute each special effect as specified by the editor. In this case, as will be described later, the editing apparatus may only execute the special effects that substitute the special effects specified by the editor in accordance with the primary conversion table. On the other hand, the reproducing apparatus may not always perform the special effects as specified by the editor. In this case, as will be described later, the reproducing apparatus may only provide the special effects that substitute the special effects specified by the editor in accordance with conversion tables. The substitution is performed in accordance with the primary conversion table and the secondary conversion table.

FIG. 2 shows a portion associated with wipe, one of these standard special effects. FIG. 2 is configured by type, transition type, transition subtype, and wipe code columns. Type, transition type, and transition subtype are the hierarchical classification of standard wipes, type being a generic concept, transition type being an intermediate concept, and transition subtype being a narrow concept. Wipe code is the identification corresponding to each transition subtype.

In the first embodiment, the standard wipes include LeftToRight, TopToBottom, TopLeft, TopRight, BottomLeft, BottomRight, Rectangle, and Diamond. A wipe code is assigned to each standard wipe; 1 to LeftToRight, 2 to TopToBottom, 3 to TopLeft, 4 to TopRight, 5 to BottomLeft, 6 to BottomRight, 101 to Rectangle, and 102 to Diamond. These wipe codes are attached to image data as the data for specifying special effects in nondestructive editing. The type of each standard wipe is transition, the transition type of LeftToRight and TopToBottom is BarWipe, the transition type of TopLeft, TopRight, BottomLeft, and BottomRight is BoxWipe, and the transition type of Rectangle and Diamond is IrisWipe.

It should be noted that FIG. 2 shows the wipe patterns defined by SMPTE (Society of Motion Picture and Television Engineers) 258M-1993. The notational name of each wipe pattern is as used in SMIL (Synchronized Multimedia Integration Language) 2.0 and the wipe code of each wipe pattern is as defined in SMPTE 285M-1993.

The primary conversion table is a correlation table between the special effects (original special effects) to be provided on a particular video and the special effects (alternative special effects), which are used as alternatives if the original special effects selected from the standard special effects are not installed on the reproducing apparatus for reproducing the particular video. The primary conversion table may be created by the editor who edits image data and attached to the edited image data as will be described later or may be installed in each editing apparatus as a specified value table, which is attached to image data by the editing apparatus.

For example, referring to FIG. 3, if the original special effect is TopToBottom of BarWipe as found by referencing FIG. 2, TopToBottom of BarWipe is selected as the alternative special effect; if the original special effect is TopLeft of BoxWipe, TopLeft of BoxWipe is selected as the alternative special effect; if the original special effect is TopRight of BoxWipe, TopRight of BoxWipe is selected as the alternative special effect; if the original special effect is TopCenter of BoxWipe, TopLeft of BoxWipe is selected as the alternative special effect; if the original special effect is BottomCenter of BoxWipe, BottomRight of BoxWipe is selected as the alternative special effect; if the original special effect is Up of TriangleWipe, Rectangle of IrisWipe is selected as the alternative special effect; if the original special effect is Right of TriangleWipe, Diamond of IrisWipe is selected as the alternative special effect; if the original special effect is Left of TriangleWipe, Diamond of IrisWipe is selected as the alternative special effect; and if the original special effect is Down of TriangleWipe, Diamond of IrisWipe is selected as the alternative special effect.

Referring to FIG. 1 again, the primary conversion table attachment processing block 19 read edited data from the edited data storage block 16, attaches the primary conversion table to the edited data, and stores the resultant edited data into the edited data storage block 16 again.

The reproduction condition setting block 14 sets the validity or invalidity of each special effect that can be handled in the image reproducing block 13. By switching between validity and invalidity, the result of editing may be confirmed. The reproduction condition setting block 14 is connected to the image reproducing block 13 and the data output block 20.

The data output block 20 records the edited image data to an external recording medium. If the edited image data are of external reference format, then the original image data to be externally referenced are linked with the special effect instruction data into one piece of data.

The following describes the image reproducing block 13.

Referring to FIG. 4, there is shown an exemplary configuration of the image reproducing block in the first embodiment.

In FIG. 4, the image reproducing block 13 includes an input data interface 31, an input data analysis block 32, a primary conversion table storage block 33, a special effect instruction storage block 35, a primary conversion block 36, an image data decoding block 38, a primary image memory 39, a secondary image memory 40, a special effect processing block 41, an image output block 42, and a reproduction condition storage block 44.

The input data interface 31 reads data from recording media such as CD-ROM and DVD and outputs the data to the input data analysis block 32. For example, input data interface 31 is a CD-ROM drive or a DVD drive.

The input data analysis block 32 is a circuit for discriminating input data by their contents and is connected to the primary conversion table storage block 33, the special effect instruction storage block 35, and the image data decoding block 38.

The primary conversion table storage block 33 is an erasable read-only memory such as EEPROM (Electrically Erasable Programmable Read-Only Memory) and is connected to the primary conversion block 36.

The special effect instruction storage block 35 is a storage means for storing data, a RAM for example, and is connected to the primary conversion block 36 and the special effect processing block 41.

The image data decoding block 38 is a circuit for decoding the inputted image data and is connected to the primary image memory 39 and the secondary image memory 40.

The primary image memory 39 and the secondary image memory 40 are connected to the special effect processing block 41 to store the images to be used (to be synthesized) by the special effect processing block 41.

On the other hand, the primary conversion block 36 analyzes special effect instruction data in accordance with the condition of the installation of special effects on this reproducing apparatus and the primary conversion table. The primary conversion block 36 is connected to the special effect processing block 41.

The special effect processing block 41 performs special effects on image data in accordance with the special effect instruction data and outputs the resultant image data to the image output block 42.

The image output block 42 converts the image data provided with special effects into a signal suitable for the display apparatus and outputs the signal thereto.

The following describes operations of the editing apparatus in the first embodiment.

Referring to FIG. 5, there is shown a flowchart describing operations of the editing apparatus in the first embodiment.

In FIG. 5, the editor selects an editing operation through the operator block 18 of the editing apparatus (S11).

If the selected editing operation is for entering video data, the editing apparatus executes a video data input routine and returns to step S11 (S21); if the selected editing operation is not for entering video data, then the editing apparatus executes S13 (S12).

In S13, if the selected editing operation is for primary conversion table editing, the editing apparatus executes a primary conversation table creating/editing routine and returns to S11 (S22); if the selected editing operation is not for primary conversion table editing, then the editing apparatus executes S14.

In S14, if the selected editing operation is for moving-image editing, the editing apparatus executes moving-image editing and returns to S11 (S23); if the selected editing operation is not for moving-image editing, the editing apparatus executes S15.

In S15, if the selected editing operation is for primary conversion table attachment, the editing apparatus executes a primary conversion table attaching routine and returns to S11 (S24); if the selected editing operation is not for primary conversion table attachment, the editing apparatus executes S16.

In S16, if the selected editing operation is for setting change, the editing apparatus changes the settings of the reproducing apparatus and returns to S11 (S25); if the editing operation is not for setting change, the selected editing apparatus executes S17.

In S17, if the selecting editing operation is for reproduction, the editing apparatus executes the specification and reproduction of video data and returns to S11 (S26); if the selected editing operation is not for reproduction, the editing apparatus executes S18.

In S18, if the selected editing operation is for video data outputting, the editing apparatus executes a data output routine and returns to S11 (S27); if the selected editing operation is not for video data outputting, the editing apparatus executes S19.

In S19, if the selected editing operation is for operation ending, the editing apparatus ends the execution of the operation program; if the selected editing operation is not for operation ending, the editing apparatus returns to S11.

The following describes each subroutine.

Figure 6:
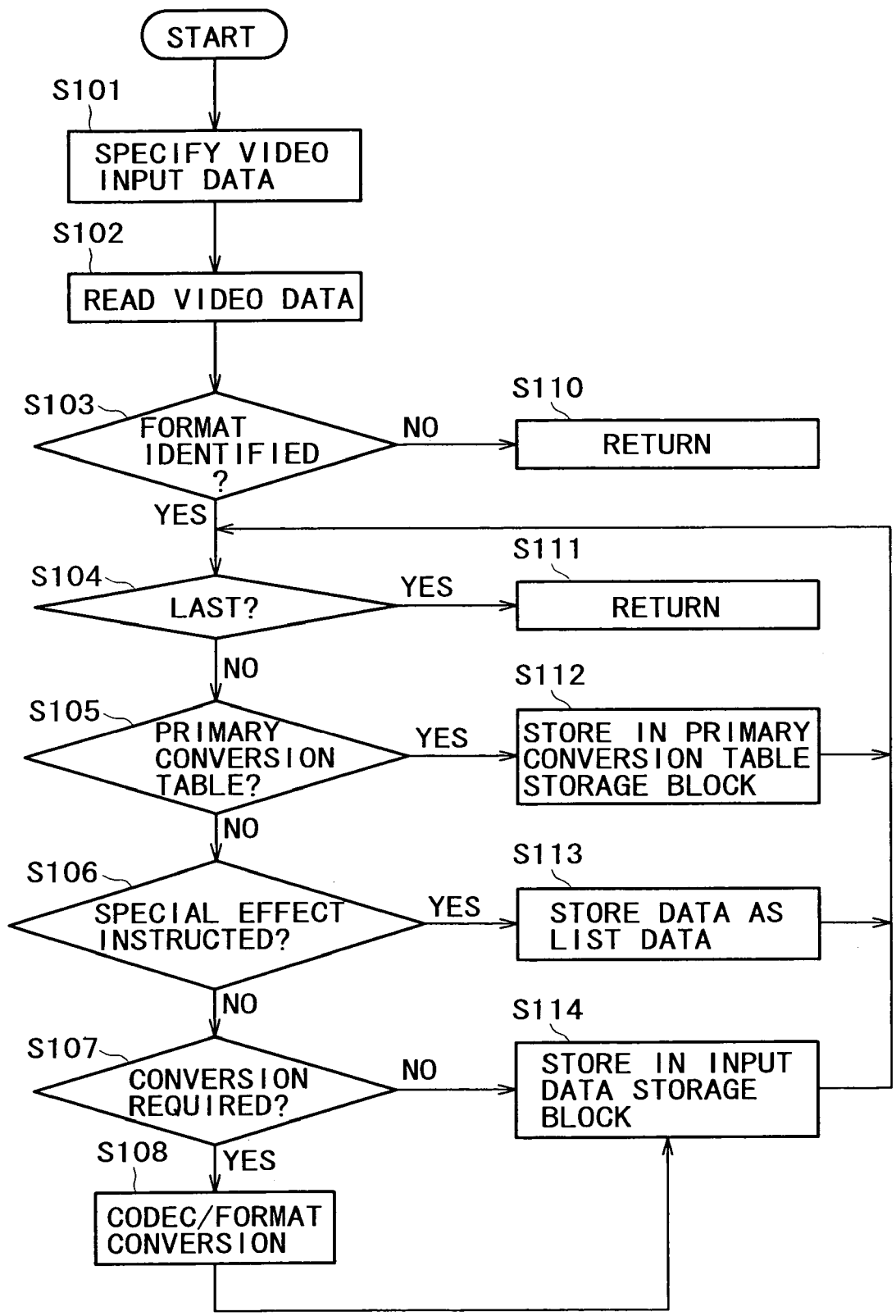
FIG. 6 is a flowchart describing an image data input routine in the first embodiment.

Referring to FIG. 6, there is shown a flowchart describing the video data input routine in the first embodiment.

In FIG. 6, when the editor specifies the video data to be edited through the operator block 18 (S101), the data input block 11 reads in the specified video dada (S102).

Next, the data input block 11 identifies the format of the video data. If the format is of a type which allows non-destructive editing, a QT file for example, the data input block 11 executes the process of S104; if not, the data input block 11 outputs an error code and returns to the main routine (S110).

In S104, the data input block 11 determines whether there is the read-in video data. If there is the read-in video data, the data input block 11 executes S105; if there is no more read-in video data, the data input block 11 returns to the main routine (S111).

In S105, the data input block 11 determines the contents of the video data in each predetermined portion of the read-in video data. As a result of the determination, if the primary conversion table is not found, the data input block 11 executes S106; if the primary conversion table is found, the data input block 11 stores the video data in that portion into the primary conversion table storage block 22 and then returns to S104 (S112).

In S106, the data input block 11 determines the contents of the next portion of the read-in video data. If, as a result of the determination, the contents are not a special effect instruction, then the data input block 11 executes S107; if the contents are a special effect instruction, the data input block 11 stores the video data in that portion into the primary conversion table storage block 22 as list form data so that the correlation between the special effects and the moving-image data oh which these special effects are performed is known and then returns to S104 (S113).

In S107, the data input block 11 determines whether the format and the code are those which can be handled in this editing apparatus. If the format and the code are found incapable of being handled on in this editing apparatus, the data input block 11 executes S108; if they are found capable of being handled in this editing apparatus, the data input block 11 stores the moving-image data in that portion into the input data storage block 12 and returns to S104 (S114).

In S108, the data input block 11 converts the format and code of the moving-image data into those which can be handled in this editing apparatus and stores the resultant moving-image data into the input data storage block 12, returning to S104 (S114).

The following describes the primary conversion table creating/editing routine.

Figure 7:
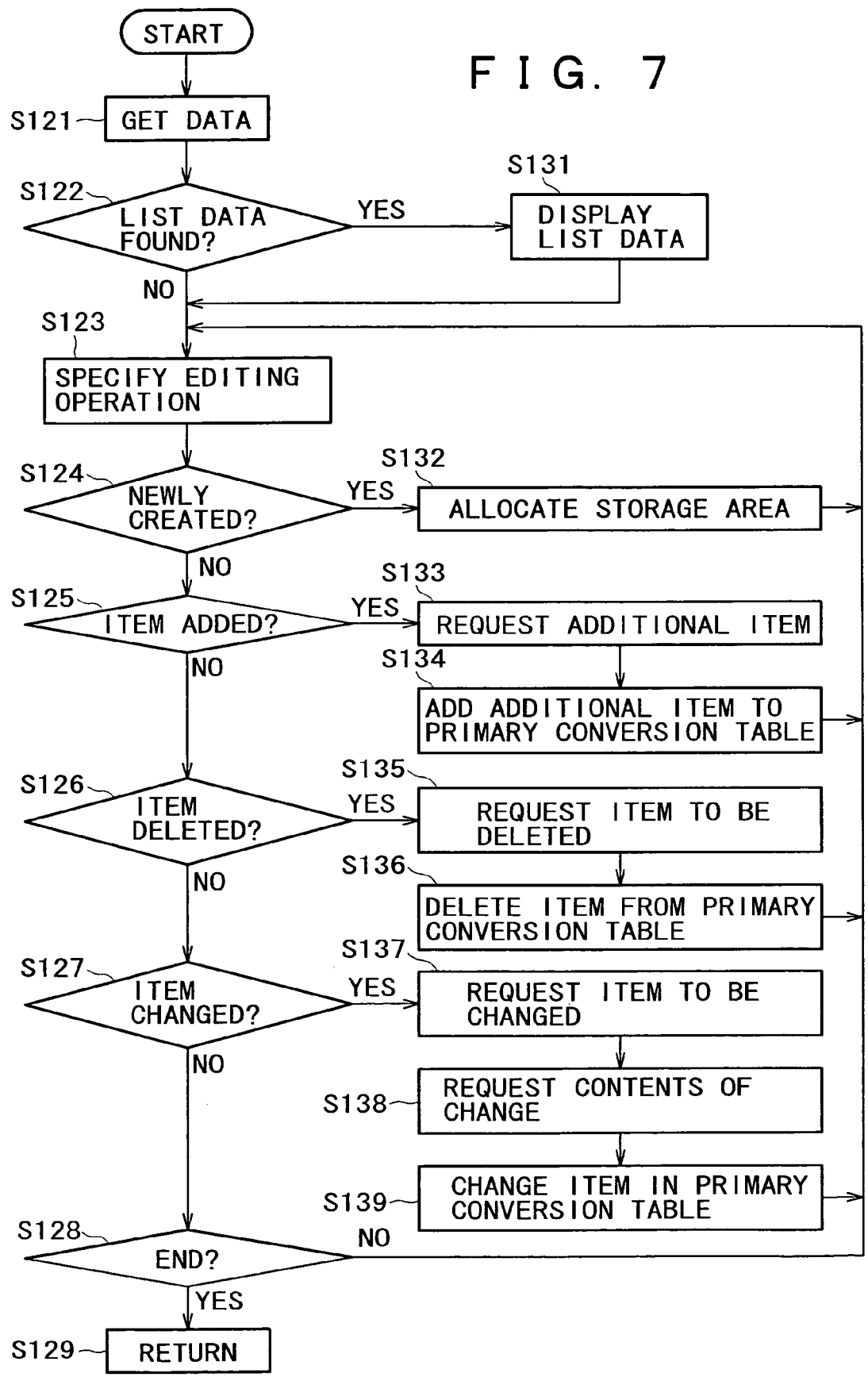
FIG. 7 is a flowchart describing a primary conversion table creating/editing routine in the first embodiment.

Referring to FIG. 7, there is shown a flowchart describing the primary conversion table creating/editing routing in the first embodiment.

In FIG. 7, if a primary conversion table is stored in the primary conversion table storage block 22, the primary conversion table editing block 21 reads in this primary conversion table (S121).

Next, the primary conversion table editing block 21 determines whether the list data indicative of a special effect instruction is stored in the primary conversion table storage block 22 (S122). If the list data are found, the primary conversion table editing block 21 displays the list data on the primary conversion table display block 23 and then executes S123. If the list data are not found, the primary conversion table editing block 21 executes S123.

Next, when the editor specifies the operation for editing the primary conversion table, the primary conversion table editing block 21 receives the specification through the operator block 18 (S123).

The primary conversion table editing block 21 determines the contents of the specification (S124). As a result of the determination, if the specification is for newly creating a primary conversion table, the primary conversion table editing block 21 allocates a storage area in the primary conversion table storage block 22 and returns to S123 (S132). On the other hand, if the specification is not for newly creating a primary conversion table, the primary conversion table editing block 21 executes S125.

In S125, the primary conversion table editing block 21 determines whether the contents of the specification are for adding a record of the primary conversion table. If, as a result of the determination, the specification is found for the addition of a record of the primary conversion table (the addition of a line indicative of the correlation between a special effect and its alternative), the primary conversion table editing block 21 requests the editor for the inputting of the contents of an item to be added (S133), adds the item entered through the operator block 18 to the primary conversion table, and returns to S123 (S134). On the other than, if the addition of a record is not required, the primary conversion table editing block 21 executes S126.

In S126, the primary conversion table editing block 21 determines whether the contents of the specification are for the deletion of an item. If the contents of the specification are found for the deletion of an item (the deletion of a line indicative of the correlation between a special effect and its alternative), the primary conversion table editing block 21 requests the editor for the contents of an item to be deleted (S135), deletes the item entered through the operator block 18 from the primary conversion table, and returns to S123 (S136). On the other hand, if the contents of the specification are not for the deletion of an item, the primary conversion table editing block 21 executes S127.

In S127, the primary conversion table editing block 21 determines whether the contents of the specification is for changing items. If the contents of the specification are found for changing the contents of a record in the primary conversion table (the changing of the correlation between a special effect and its alternative), the primary conversion table editing block 21 requests the editor for entering the item to be changed (S137). Next, the primary conversion table editing block 21 requests the editor for entering the contents of the item to be changed (S138). Then, the primary conversion table editing block 21 changes items in the primary conversion table on the basis of the item and its contents entered through the operator block 18 and returns to S123 (S139). On the other hand, if the contents of the specification are found not for changing items, the primary conversion table editing block 21 executes S128.

In S128, the primary conversion table editing block 21 determines whether the contents of the specification are for ending the editing operation. If the contents of the specification are found for the ending of the editing operation, the primary conversion table editing block 21 returns to the main routine (S129); if not, the primary conversion table editing block 21 returns to S123.

The following describes the moving-image editing routine.

Figure 8:
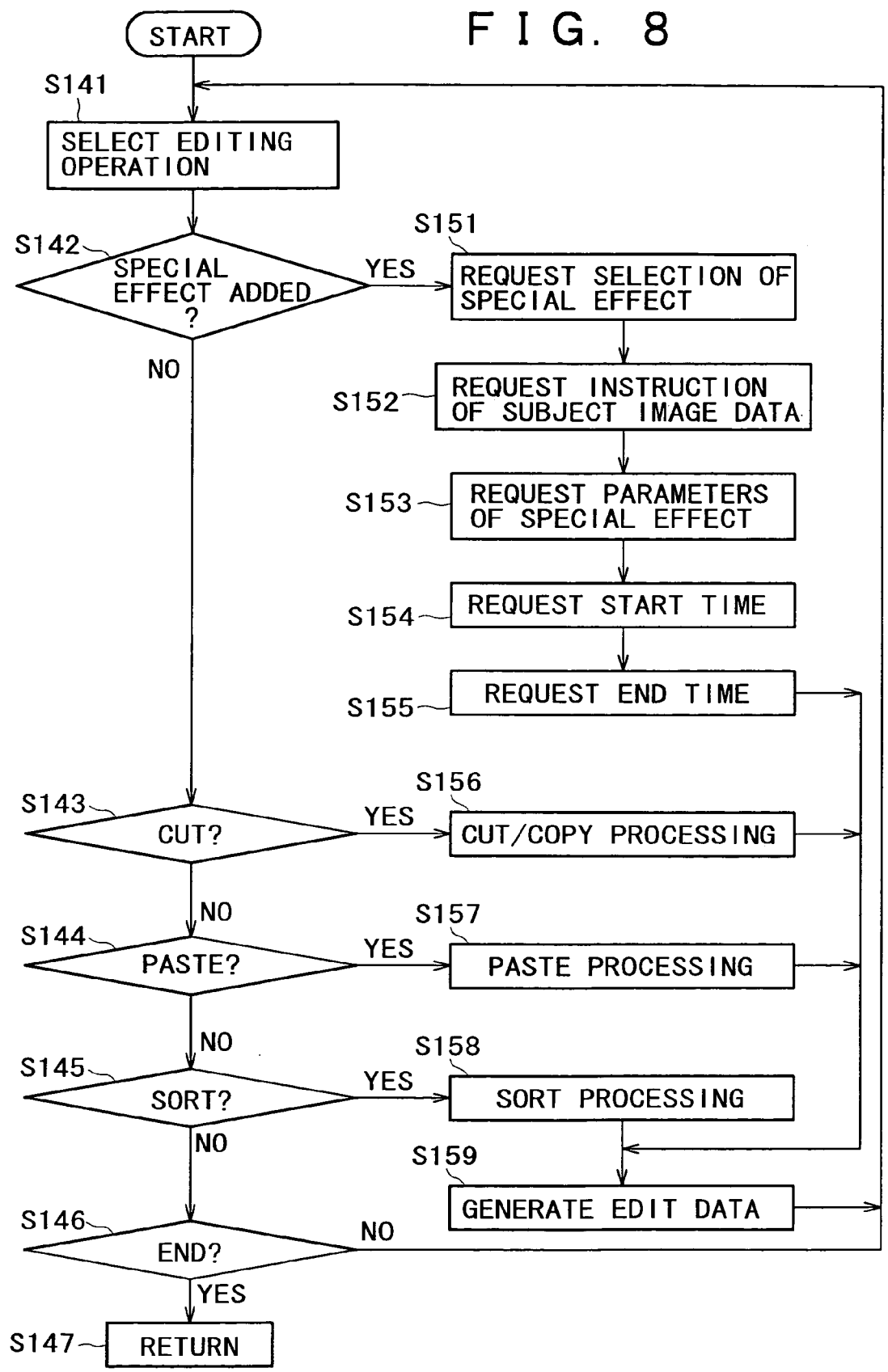
FIG. 8 is a flowchart describing a moving-image editing routine in the first embodiment.

Referring to FIG. 8, there is shown a flowchart describing the moving-image editing routine in the first embodiment.

In FIG. 8, when the editor selects an editing operation, the data editing block 15 requests the editor for the contents of the editing operation (S141).

Next, the data editing block 15 determines whether the contents of editing are for the attachment of a special effect (S142). If the contents of editing are not for the attachment of a special effect, the data editing block 15 executes S143. On the other hand, if the contents of editing are found for the attachment of a special effect, the data editing block 15 requests the editor for the selection of a special effect to be provided (S151). Next, the data editing block 15 requests the editor for the selection of the moving-image data on which the selected special effect is provided (S152). Then, if the special effect to be provided has parameters to be set, the data editing block 15 requests the editor for these parameters (S153). The parameters include, for example, the color, shape, and direction of the special effect to be provided. Next, the data editing block 15 requests the editor for the start time from which the special effect is provided (S154). Then, the data editing block 15 requests the editor for the end time at which the provision of the special effect ends (S155). Next, the data editing block 15 executes the process of step S159, namely creates edited data on the basis of the entered data. Then, the data editing block 15 returns to S141.

On the other hand, in step S143, the data editing block 15 determines whether the contents of editing are for the cutting of video. If the contents of editing are found not for the cutting of video, the data editing block 15 executes S144; if the contents of editing are found the cutting of video, the data editing block 15 executes a cut/copy operation on the video and then executes S159 (S156).

In S144, the data editing block 15 determines whether the contents of editing are for the pasting of video. If the contents of editing are found not the pasting of video, the data editing block 15 executes S145; if the contents of editing are found the pasting of video, the data editing block 15 performs the pasting of video and then executes S159 (S157).

In S145, the data editing block 15 determines whether the contents of editing are for the sorting of video. If the contents of editing are found not the sorting of video, then the data editing block 15 executes S146; if the contents of editing are for the sorting of video, the data editing block 15 performs the sorting of video and the executes S159 (S158).

In S146, the data editing block 15 determines whether the contents of the specification are for the ending of the moving-image editing operation. If the contents of the specification are found the ending of the attaching operation, the data editing block 15 returns to the main routine (S147); if not, the data editing block 15 returns to S141.

The following describes the primary conversion table attaching routine.

Figure 9:
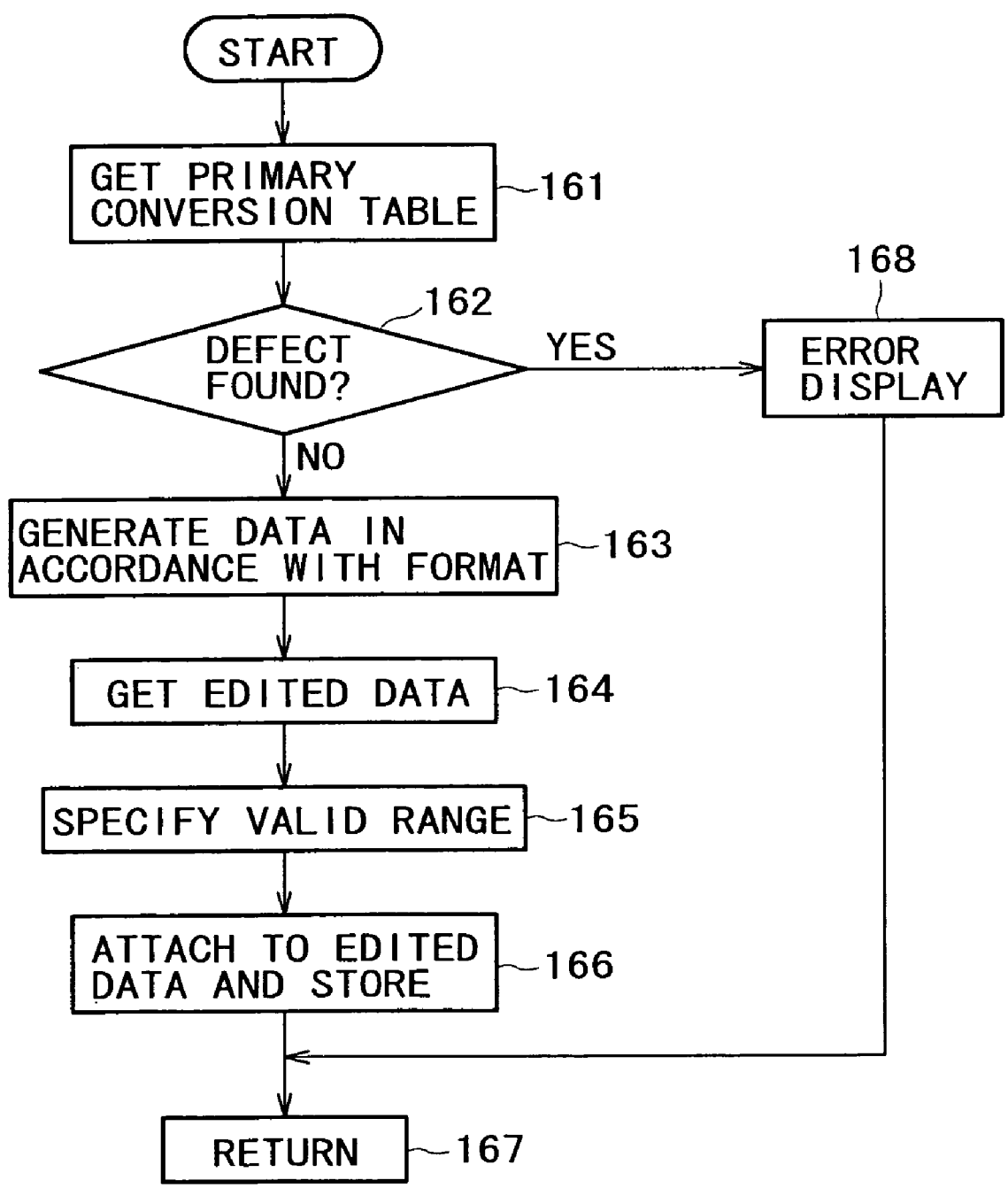
FIG. 9 is a flowchart describing a primary conversion table attaching routine in the first embodiment.

Referring to FIG. 9, there is shown a flowchart describing the primary conversion table attaching routine in the first embodiment.

In FIG. 9, the primary conversion table attachment processing block 19 reads in the primary conversion table from the primary conversion table storage block 22 (S161).

Next, the primary conversion table attachment processing block 19 checks the read-in primary conversion table for any flaw (S162). If there found any flaw, the primary conversion table attachment processing block 19 outputs an error message (S168) and then executes the process of S167, namely returns to the main routine. On the other hand, if there are found no flaw, the primary conversion table attachment processing block 19 executes the process of S163.

The flaw in the primary conversion table includes, for example, that, although the video data have been edited by use of a particular special effect, the standardized special effect alternative to that particular special effect has not been specified.

Next, the primary conversion table attachment processing block 19 converts the primary conversion table into the same data format as that of the moving-image data. For example, if the moving-image data are of the QT format, then the primary conversion table attachment processing block 19 creates a data atom from the real data of the primary conversion table and creates a resource atom, which manages this data atom.

Next, the primary conversion table attachment processing block 19 reads in the edited moving-image data from the edited data storage block 16 (S164).

Next, the primary conversion table attachment processing block 19 requests the editor to specify, through the operator block 18, a moving-image data range, which validates the primary conversion table (S165).

If QT is used for example, the specification of the valid range in which the primary conversion table is applied is performed by providing information to the edit list atom and the time-to-sample atom.

Next, the primary conversion table attachment processing block 19 attaches the primary conversion table having the matching data format to the moving-image data, stores the resultant moving-image data into the edited data storage block 16 (S166), and returns to the main routine (S167).

The following describes the data output routine.

Figure 10:
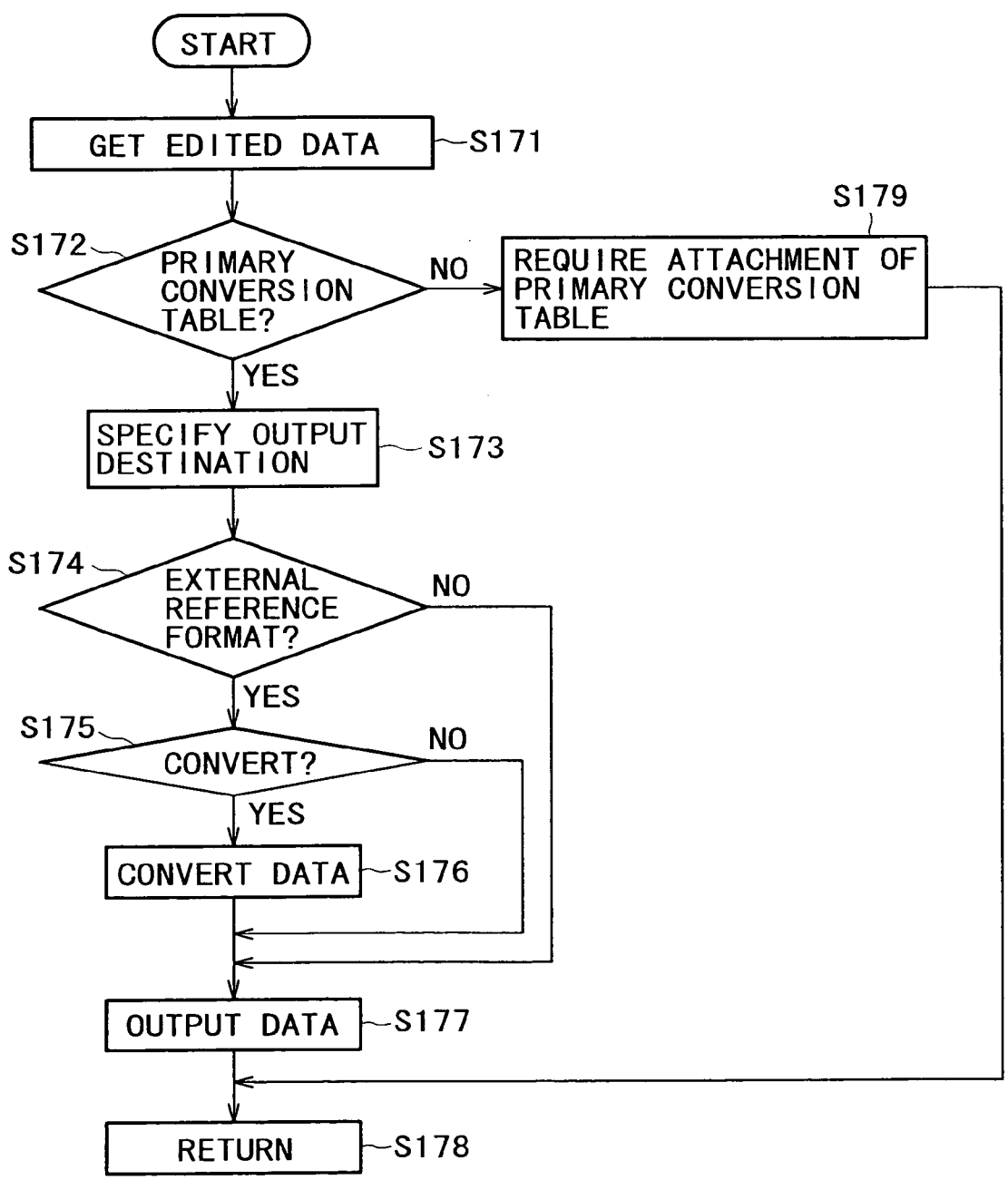
FIG. 10 is a flowchart describing a data output routine in the first embodiment.

Referring to FIG. 10, there is shown a flowchart describing the data output routine in the first embodiment.

In FIG. 10, the data output block 20 reads in video data from the edited data storage block 16 (S171).

Next, the data output block 20 determines whether the read-in video data are attached with the primary conversion table. If the primary conversion table is found attached, the data output block 20 executes S173; if not, the data output block 20 requests for the attachment of the primary conversion table (S179) and returns to the process of S178, namely the main routine.

In S173, the data output block 20 requests the editor to specify a destination to which the video data are outputted. The output destination is a disk medium or a file on the hard disk, for example.

Next, the data output block 20 determines whether the video data are of the external reference form (S174). If the video data are found of the external reference form, the data output block 20 execute the process of S175; if the video data are found of the self inclusive format, the data output block 20 outputs the data without change (S177).

In S175, the data output block 20 determines whether the editor has permitted the conversion of the video data. If the conversion of the video data is found permitted, the data output block 20 outputs the video data while converting (S176, S177); if not, the data output block 20 outputs the video data without change (S177).

For example, the video data are converted from the external reference form to the self inclusive form.

Then, the data output block 20 returns the procedure to the main routine (S178).

Figure 11:
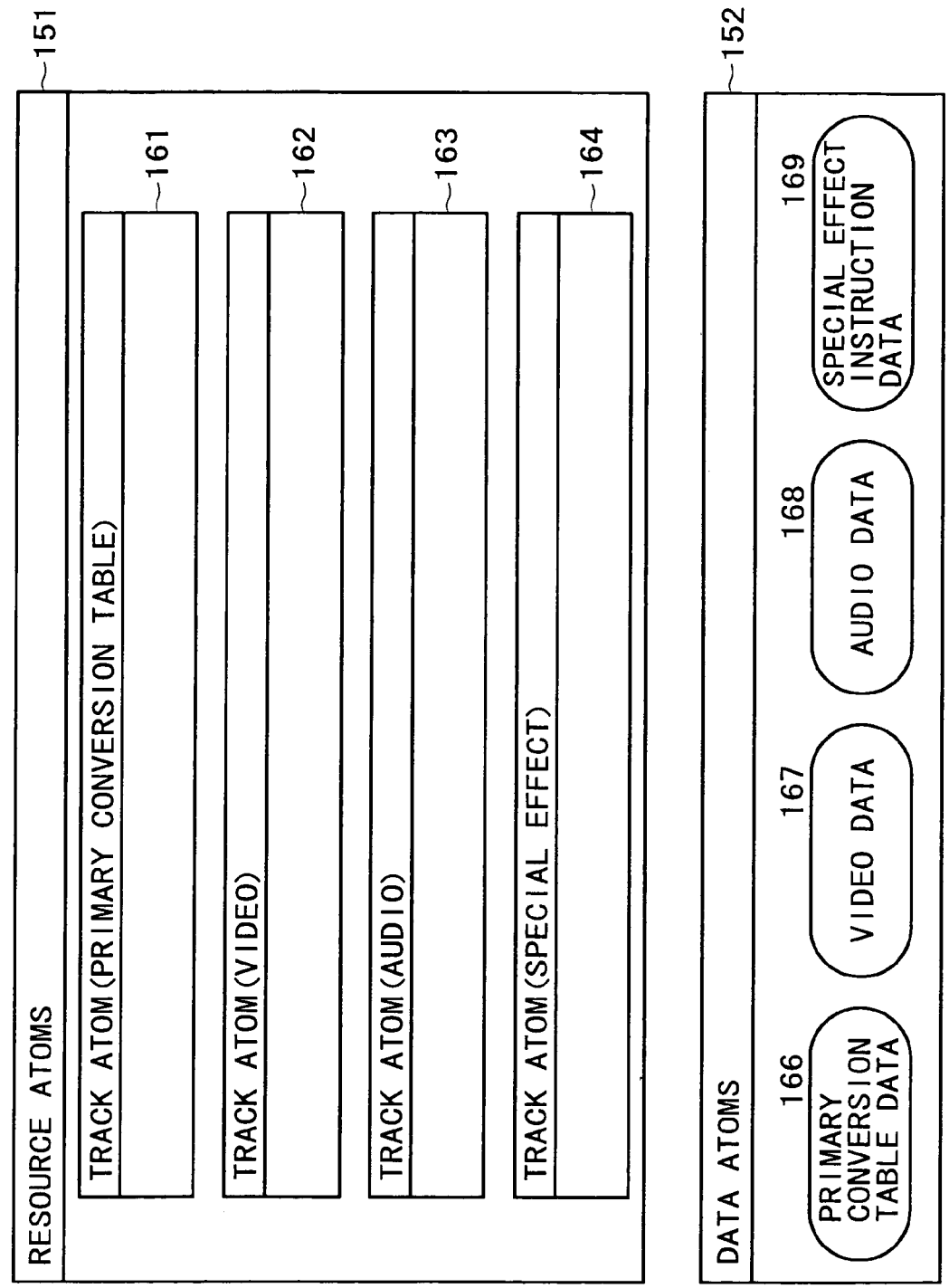
FIG. 11 shows an exemplary configuration of input data.

Thus, the video data provided with a special effect by the editing apparatus are configured as shown in FIG. 11 for example in the case of a QT file.

Referring to FIG. 11, there is shown an exemplary configuration of video data.

In FIG. 11, video data is of the QT file format composed of a data atom 152 for accommodating real data and a resource atom 151 for managing the data atom 152.

The data atom 152 is composed of primary conversion table data 166, video data 167, audio data 168, and special effect data 169 in the QT format.

The resource atom 151 is composed of a track atom (track atom [primary conversion table] 161, a track atom [video] 162, a track atom [audio] 163, and a track atom [special effect] 164) for managing real data in accordance with the real data of the data atom in the QT format. It should be noted that each track atom has a flag for example for identifying the type of data to be managed by each atom. For example, if this flag is 1, it indicates that the data concerned are the primary conversion table; if this flag is 2, it indicates that the data concerned are video data 122; if this flag is 3, it indicates that the data concerned are special effect instruction data 123.

The video data are transmitted over a transmission path or recorded to a recording medium to be supplied to the reproducing apparatus.

The following describes the reproducing apparatus.

Figure 12:
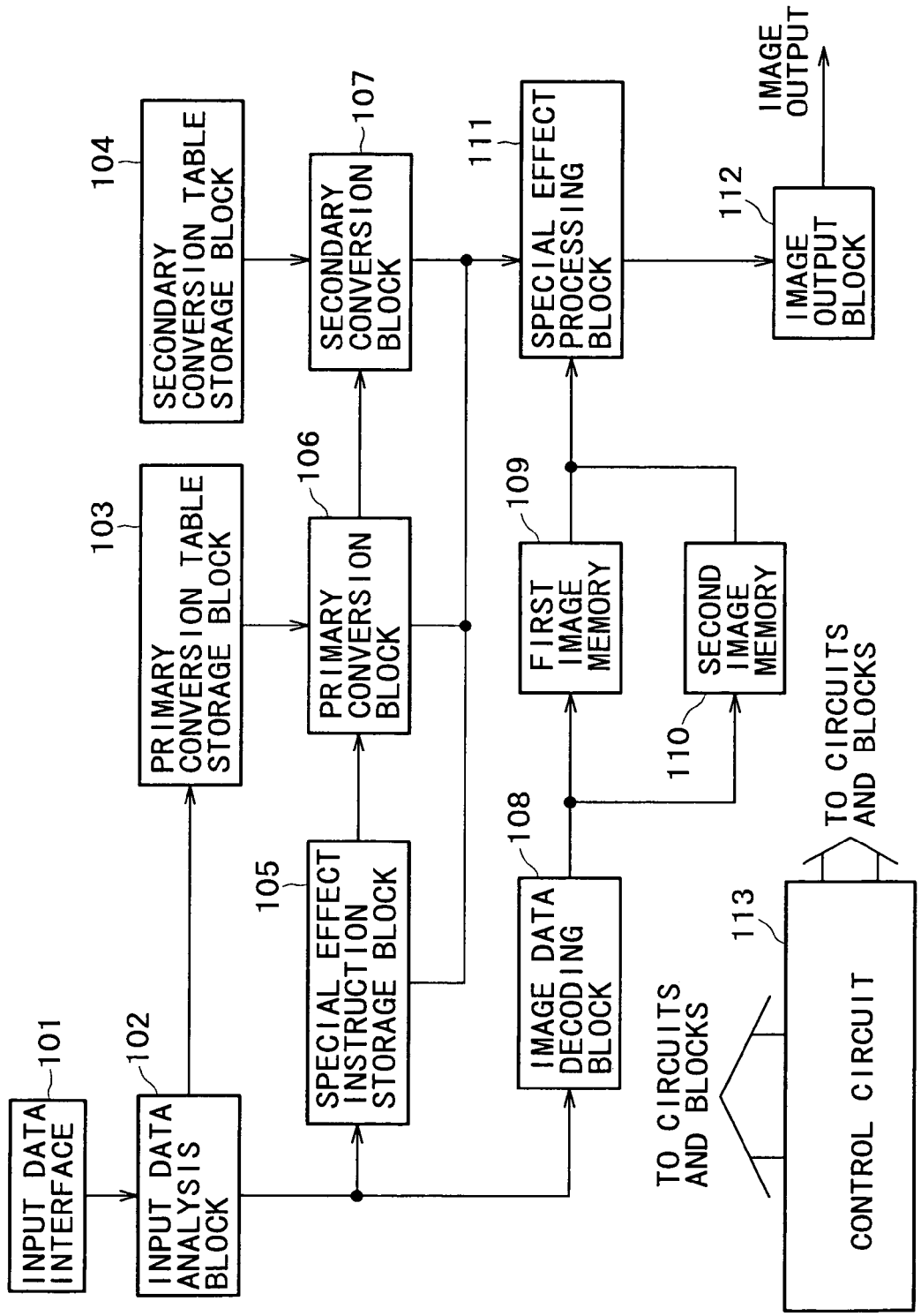
FIG. 12 is a block diagram illustrating an exemplary configuration of a reproducing apparatus associated with the first embodiment.

Referring to FIG. 12, there is shown a block diagram illustrating an exemplary configuration of the reproducing apparatus practiced as one embodiment of the invention.

In FIG. 12, the reproducing apparatus includes an input data interface 101, an input data analysis block 102, a primary conversion table storage block 103, a secondary conversion table storage block 104, a special effect instruction storage block 105, a primary conversion block 106, a secondary conversion block 107, a image data decoding block 108, a first image memory 109, a second image memory 110, a special effect processing block 111, a image output block 112, and a control circuit 113. Each of these components is constituted by an electronic circuit.

The input data interface 101 reads data from a recording medium such as CD-ROM or DVD and outputs the data to the input data analysis block 102. The input data interface 101 is a CD-ROM drive or a DVD drive, for example.

The input data analysis block 102 discriminates the input data by their contents and is connected to the primary conversion table storage block 103, the special effect instruction storage block 105, and the image data decoding block 108.

The primary conversion table storage block 103 is an erasable read-only memory such as EEPROM and is connected to the primary conversion block 106.

The special effect instruction storage block 105 is a storage means for storing data, a RAM for example, and is connected to the primary conversion block 106 and the special effect processing block 111.

The image data decoding block 108 decodes the inputted image data and is connected to the first image memory 109 and the second image memory 110.

The first image memory 109 and the second image memory 110 are connected to the special effect processing block 111 to store the images to be used in the special effect processing block 111 (the images to be synthesized).

On the other hand, the primary conversion block 106 analyzes the special effect instruction data in accordance with the condition of the installation of special effects on this reproducing apparatus and the primary conversion table. The primary conversion block 106 is connected to the secondary conversion block 107 and the special effect processing block 111.

The secondary conversion table storage block 104 is an erasable read-only memory such as EEPROM and is connected to the secondary conversion block 107.

The secondary conversion block 107 analyses the output of the primary conversion block 106 in accordance with the condition of the installation of special effects on this reproducing apparatus and the secondary conversion table. The secondary conversion block 107 is connected to the special effect processing block 111.

The special effect processing block 111 provides special effects on video data in accordance with the special effect instruction data and outputs the resultant image data to the image output block 112.

The image output block 112 converts the image data provided with special effects into a signal suitable for the display apparatus and outputs this signal thereto.

These input data interface 101, input data analysis block 102, primary conversion table storage block 103, secondary conversion table storage block 104, special effect instruction storage block 105, primary conversion block 106, secondary conversion block 107, image data decoding block 108, first image memory 109, second image memory 110, special effect processing block 111, and image output block 112 are controlled by the control circuit 113.

The following describes operations of the reproducing apparatus.

Figure 13:
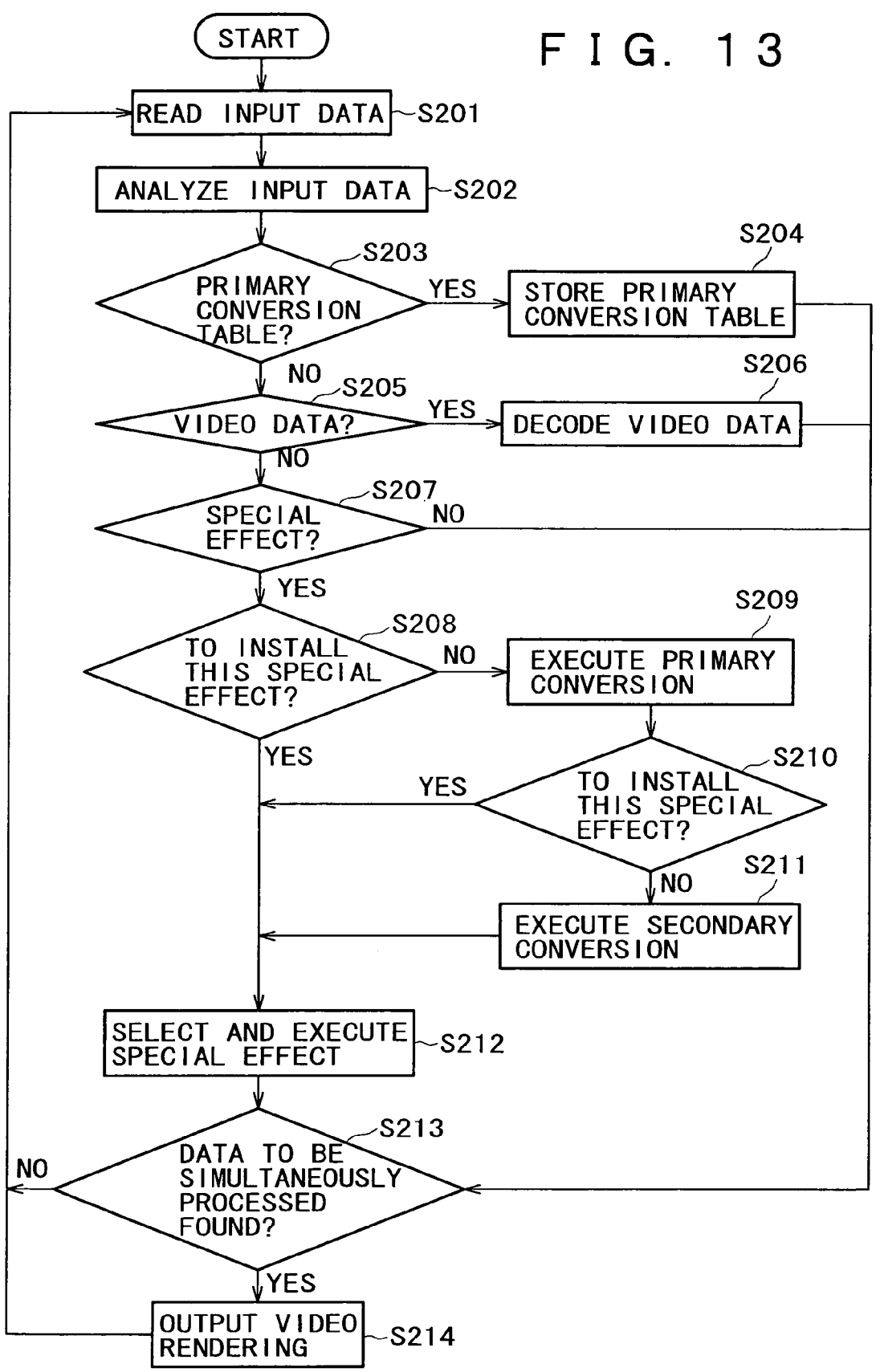
FIG. 13 is a flowchart describing operations of the reproducing apparatus associated with the first embodiment.

Referring to FIG. 13, there is shown a flowchart describing operations of the reproducing apparatus.

In FIG. 13, the control circuit 113 reads in video data through the input data interface 101 (S201).

Next, the control circuit 113 causes the input data analysis block 102 to analyze video data (S202).

The input data analysis block 102 determines the above-mentioned flag and, if the flag is 1 for example, outputs these video data to the primary conversion table storage block 103 (S203). Then, the primary conversion table storage block 103 stores the video data (S204).

If the flag is 2, the input data analysis block 102 outputs the video data to the image data decoding block 108 (S205). The image data decoding block 108 decodes the received data (S206).

Further, if the flag is 3, the input data analysis block 102 outputs these video data to the special effect instruction storage block 105 (S207). The special effect instruction storage block 105 stores the received data.

Next, the control circuit 113 causes the primary conversion block 106 to analyze the special effect instruction data. The primary conversion block 106 determines whether the special effect to be provided is installed on the reproducing apparatus (S208). If the special effect to be provided is found installed, the primary conversion block 106 selects the special effect (S212). On the other hand, if the special effect to be provided is found not installed, the primary conversion block 106 references the primary conversion table of the primary conversion table storage block 103 to convert the original special effect into its alternative special effect (the primary conversion special effect) (S209).

Next, the control circuit 113 causes the primary conversion block 106 to analyze the primary conversion special effect. The primary conversion block 106 determines whether the primary conversion special effect to be provided is installed on the reproducing apparatus (S210). If the primary conversion special effect is found installed, the primary conversion block 106 selects the special effect (S212). On the other hand, if the primary conversion special effect is found not installed, the primary conversion block 106 outputs the primary conversion special effect to the secondary conversion block 107.

Next, the secondary conversion block 107 references the secondary conversion table of the secondary conversion table storage block 104 to convert the primary conversion special effect into the corresponding installed special effect (the secondary conversion special effect) (S211) and executes S212.

The following describes the secondary conversion table.

Referring to FIG. 14, there is shown an exemplary secondary conversion table associated with the first embodiment of the invention.

The secondary conversion table is a correlation table listing the special effects to be provided on a particular video (the original special effects) and their alternative special effects, which are used if the original special effects are not installed on an apparatus for reproducing video, these alternative special effects being installed in the reproducing apparatus (the installed special effects). The secondary conversion table is installed on the reproducing apparatus as the standard installation as a table of predetermined values.

For example, it is assumed in the reproducing apparatus of the first embodiment that the wipe as the installed special effect installs BarWipe TopToBottom, BoxWipe TopLeft, BoxWipe TopRight, and IrisWipe Rectangle.

In this case, in FIG. 14, if the original special effect is found to be LeftToRight of BarWipe as a result of referencing FIG. 2, it is not installed, so that TopToBottom of BarWipe is used instead as the installed special effect; if the original special effect is TopToBottom of BarWipe, it is installed, so that TopToBottom of BarWipe is selected as the installed special effect; if the original special effect is TopLeft of BoxWipe, it is installed, so that TopLeft of BoxWipe is selected as the installed special effect; if the original special effect is TopRight of BoxWipe, it is installed, so that TopRight of BoxWipe is selected as the installed special effect; if the original special effect is BottomLeft of BoxWipe, it is not installed, so that TopLeft of BoxWipe is used instead as the installed special effect; if the original special effect is BottomRight of BoxWipe, it is not installed, so that TopRight of BoxWipe is used instead as the installed special effect; if the original special effect is Rectangle of IrisWipe, it is installed, so that Rectangle of IrisWipe is selected as the installed special effect; and, if the original special effect is Diamond of IrisWipe, it is not installed, so that Rectangle of IrisWipe is used instead as the installed special effect. Obviously, the secondary conversion is performed after the first conversion, so that the original special effects in the secondary conversion table are the standard special effects.

Next, the control circuit 113 determines whether the image data and the special effect instruction data (original special effect, primary conversion special effect, or secondary conversion special effect) to be simultaneously processed are ready for processing (S213).

If the image data and the special effect instruction data are found not ready for processing, the control circuit 113 repeats S201 through S213 until these data are ready for processing.

When these data become ready for processing, the special effect processing block 111 provides the specified special effect to the image data and outputs the resultant image data to the image output block 112. The image output block 112 outputs the image signal, which is suitable for display on the display apparatus (not shown), the outputted image signal being reproduced on the display apparatus, upon which the procedure returns to S201 (S214).

As described, in the first embodiment, any special effects used by the editor are converted into standard special effects by means of the primary conversion table, so that the reproducing apparatus may identify any special effects intended by the editor. In addition, because the reproducing apparatus associated with the first embodiment converts the standard special effects into the installed special effects by means of the secondary conversion table, the reproducing apparatus may reproduce video while executing at least the special effects installed in the reproducing apparatus.

It should be noted that, in the above description, the primary conversion table is one primary conversion table for a sequence of video data; alternatively, a plurality of primary conversion tables may arranged to switch between for predetermined intervals of video data.

Figure 15:
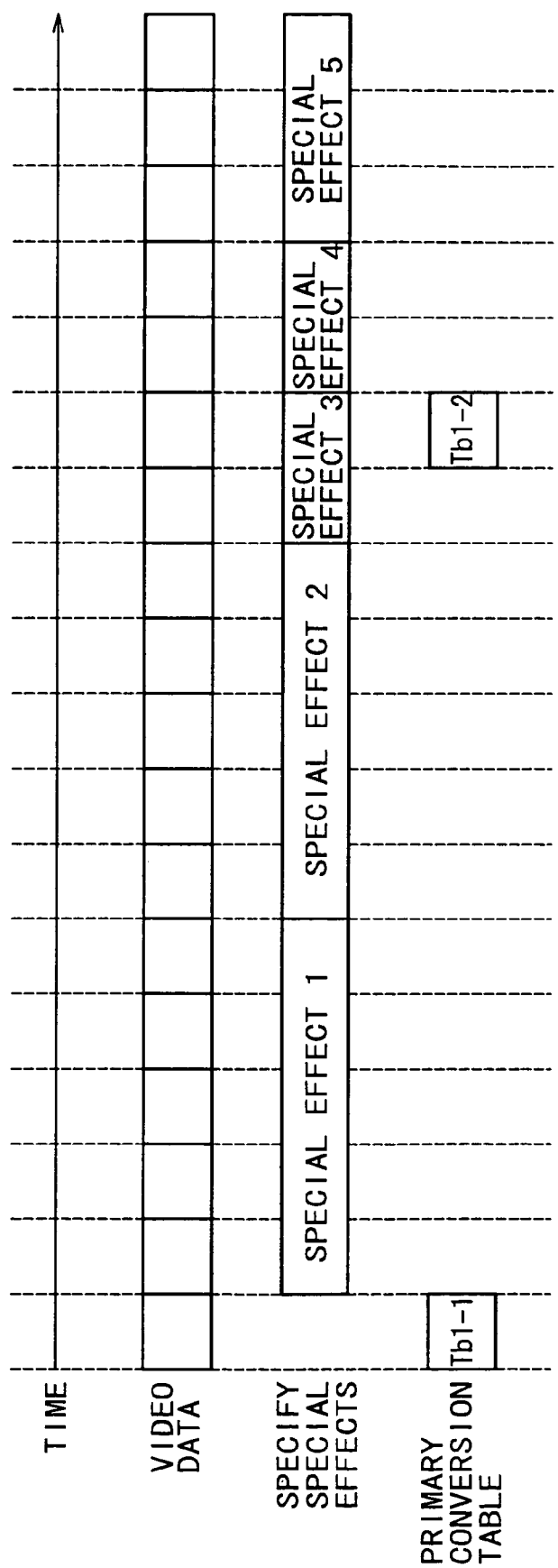
FIG. 15 shows one example of video data having a plurality of primary conversion tables.

Referring to FIG. 15, there is shown an example of video data having a plurality of primary conversion tables.

In FIG. 15, from top down, time axis, video data, special effect specification, and primary conversion data are arranged. As shown, a sequence of video data are arranged along the time axis and, in these video data, special effect 1, special effect 2, special effect 3, special effect 4, and special effect 5 are arranged. The first primary conversion data (Tbl-1) is specified to be used within a range of special effect 1 through special effect 3, and the second primary conversion data (Tbl-2) is specified to be used within a range of special effect 4 and special effect 5. This specification may be made, in the QT file format for example, by describing each valid range of the primary conversion table data to the edit list atom and sample-to-time atom.

In this case, the first primary conversion table (Tbl-1) is used for special effect 1 through special effect 3, and the second primary conversion table is used for special effect 4 and special effect 5.

Preparing a plurality of the primary conversion tables for a sequence of video data as described above allows the assignment of different alternative special effects to a same original special effect, thereby alternatively using proper special effects in accordance with the contents of an image to be processed.

The following describes a data converting apparatus as a variation to the editing apparatus.

In the above, the editing apparatus, which is capable of performing editing operations such as the provision of special effects and the addition of primary conversion tables, is described. The data converting apparatus as a variation to this editing apparatus only adds primary conversion tables to the video data of a format allowing non-destructive editing provided with special effects.

Figure 16:
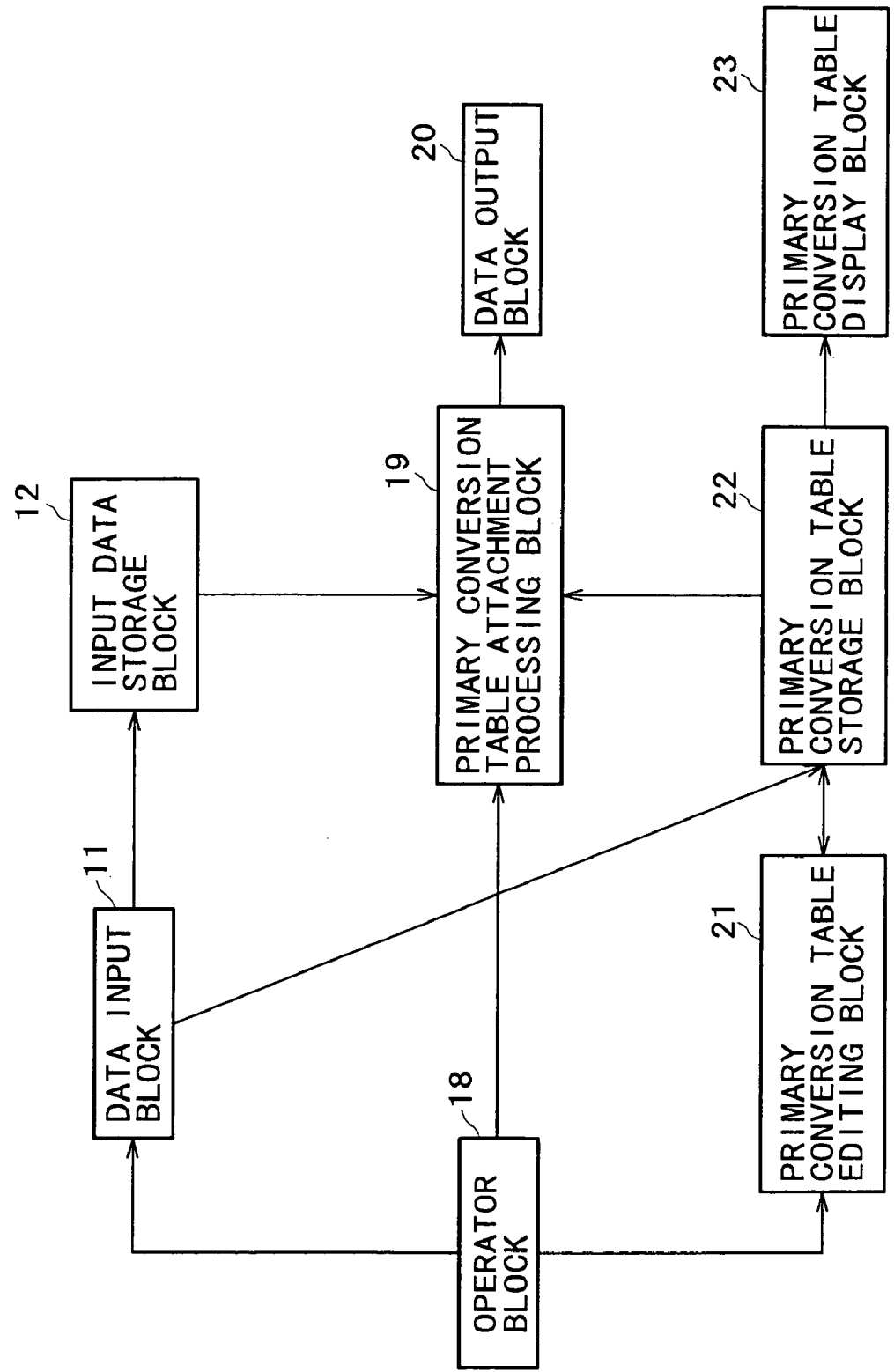
FIG. 16 is a block diagram illustrating an exemplary configuration of a data converting apparatus.

Referring to FIG. 16, there is shown a block diagram illustrating an exemplary configuration of the data converting apparatus.

In FIG. 16, the data converting apparatus includes a data input block 11, an input data storage block 12, an operator block 18, a primary conversion table attachment processing block 19, a data output block 20, a primary conversion table editing block 21, a primary conversion table storage block 22, and a primary conversion table display block 23.

The operator block 18 is connected to the data input block 11, primary conversion table attachment processing block 19, and the primary conversion table editing block 21. The data input block 11 is connected to the input data storage block 12 and the primary conversion table storage block 22. The input data storage block 12 is connected to the primary conversion table attachment processing block 19. The primary conversion table editing block 21 is connected to the primary conversion table storage block 22. The primary conversion table storage block 22 is connected to the primary conversion table attachment processing block 19 and the primary conversion table display block 23. The primary conversion table attachment processing block 19 is connected to the data output block 20. It should be noted that the operations of these components are substantially the same as those described with reference to FIG. 1, so that their descriptions will be skipped.

Second Embodiment

In the first embodiment, the primary conversion table and the secondary conversion table are used to convert original special effects into, on a one to one basis, the primary conversion special effects and then the secondary conversion special effects in a fixed manner. In the second embodiment, the special effects are arranged in a hierarchical structure according to their types, so that the original special effects may be converted into the primary conversion special effects and then the secondary conversion special effects according to the installation conditions of each reproducing apparatus in a flexible manner.

An editing apparatus used in the second embodiment is substantially the same as that used in the first embodiment, so that its description will be skipped.

A reproducing apparatus used in the second embodiment is generally the same as that used in the first embodiment except for the operations of the primary conversion block 106 and the secondary conversion block 107, so that its description will be skipped.

Figure 17:
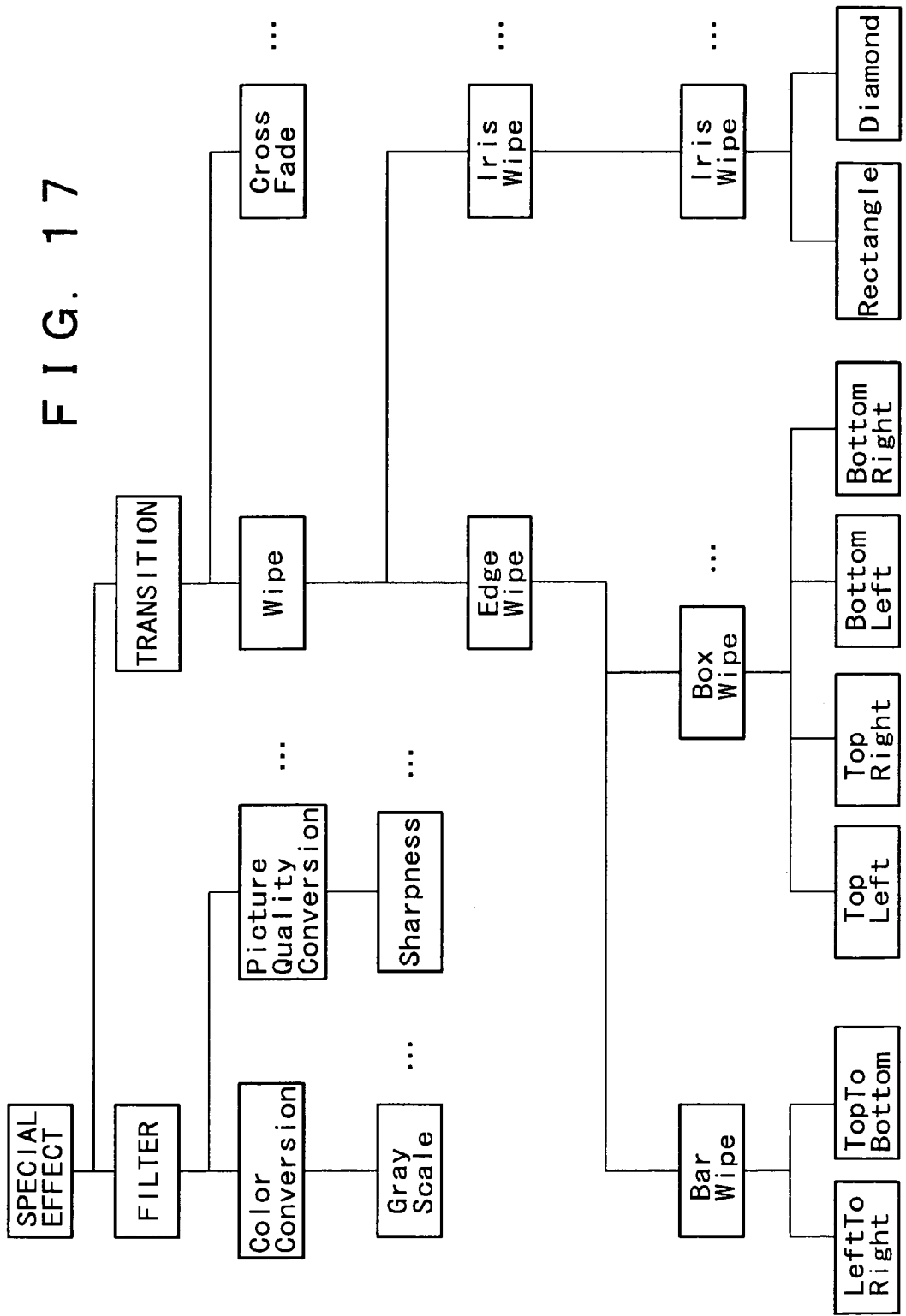
FIG. 17 is a block diagram illustrating one example of the hierarchical classification of special effects in a second embodiment of the invention.

Referring to FIG. 17, there is shown an example of the hierarchical classification of the special effects in the second embodiment.

Referring to FIG. 18, there is shown an example of a primary conversion table in the hierarchical structure in the second embodiment.

Referring to FIG. 19, there is shown an example of a secondary conversion table in the hierarchical structure in the second embodiment.

As shown in FIG. 17, the special effects are classified into filter and transition at the top generic concept in this example. The transition is classified into Wipe and Cross Fade at the next higher layer. The Wipe is classified into EdgeWipe and IrisWipe at the next layer of the Wipe. It should be noted that the layer next to Cross Fade is omitted in FIG. 17. The EdgeWipe is classified into BarWipe and BoxWipe at the next layer of the EdgeWipe. The BarWipe is classified into LeftToRight and TopToBottom at the bottom layer. The BoxWipe is classified into TopLeft, TopRight, BottomLeft, and BottomRight at the bottom layer. The IrisWipe is classified into IrisWipe at the next layer of the IrisWipe. The IrisWipe is classified into Rectangle and Diamond at the bottom layer.

On the other hand, the filter is classified into Color Conversion, Picture Quality Conversion, and so on at the next higher layer. The Color Conversion is classified into Gray Scale and so on at the next layer of the Color Conversion. The Picture Quality Conversion is classified into Sharpness and so on at the next layer of the Picture Quality Conversion. It should be noted that, in FIG. 17, the layers next to gray scale and sharpness are omitted. In the special effects classified into layers, the alternative special effects listed in the primary conversion table may be specified in a particular layer (or Type) and a layer (Subtype) below the particular layer.

Referring to FIG. 18, if TopToBottom of BarWipe is specified by the editor as an original special effect for example, TopToBottom is below BarWipe, so that the editor can specify BarWipe (Type=BarWipe) at the upper layer and TopToBottom (Subtype=TopToBottom) at the lower layer as alternative special effects. If the editor specifies TopLeft of BoxWipe as an original special effect for example, TopLeft is below BoxWipe, so that the editor can specify BoxWipe (Type=BoxWipe) at the upper layer and TopLeft (Subtype=TopLeft) as the lower layer as alternative special effects. If the editor specifies TopCenter of BoxWipe (BoxWipe TopCenter) as an original special effect for example, TopCenter is not a standard special effect and is below BoxWipe, so that the editor can specify BoxWipe (Type=BoxWipe) at the upper layer and TopLeft (Subtype=TopLeft) at the lower layer as alternative special effects. If the editor specifies Left of TriangleWipe as an original special effect, the editor can specify IrisWipe (Type=IrisWipe) as the alternative special effect at the upper layer and omit the specification of the lower layer (Subtype=-). If an original special effect may be substituted by any special effect at the lower layer of that upper layer, the editor may specify only the special effect at the upper layer and omit the specification of the special effect at the lower layer.

The secondary conversion table lists the original special effects (the input side) in a hierarchical structure. If there is no installed special effect corresponding to a particular original special effect, the original special effects are followed up in the hierarchical structure until the corresponding installed special effect is encountered. Therefore, it is required to allocate the installed special effects corresponding to the original special effect at the top layer in the secondary conversion table.

In the reproducing apparatus in the second embodiment, it is assumed that LeftToRight of BarWipe, TopLeft of BoxWipe, TopRight of BoxWipe, and CrossFade be installed as wipe special effects.

In this case, in FIG. 19, by referencing FIG. 17, if the original special effect is a transition, then LeftToRight of BarWipe is specified as the installed special effect; if the original special effect is LeftToRight of BarWipe, it is installed, so that LeftToRight of BarWipe is selected as the installed special effect; if the original special effect is BoxWipe, it is not installed, so that TopLeft of BoxWipe is used instead as the installed special effect; if the original special effect is TopLeft of BoxWipe, it is installed, so that TopLeft of BoxWipe is selected as the installed special effect; if the original special effect is TopRight of BoxWipe, it is installed, so that TopRight of BoxWipe is selected as the installed special effect; if the original special effect is IrisWipe, it is not installed, so that CrossFade is used instead as the installed special effect; and if the original special effect is Rectangle of IrisWipe, it is not installed, so that NoEffect is used instead as the installed special effect.

If the original special effect is CrossFade, it is installed, so that CrossFade is selected as the installed special effect; if the original special effect is GrayScale of ColorConversion, it is installed, so that GrayScale of ColorConversion is selected as the installed special effect; and if the original special effect is Sharpness of PictureQualityConversion, it is not installed, so that NoEffect is used instead as the installed special effect.

On the other hand, if the original special effect is Wipe, EdgeWipe, BarWipe, TopToBottom of BarWipe, BottomLeft of BoxWipe, BottomRight of BoxWipe, Diamond of IrisWipe, ColorConversion, or PictureQualityConversion, there is no specification of an installed special effect. Alternatively, the original special effects listed in the secondary conversion table are put in a hierarchical structure, thereby substituting the above-mentioned effects by the installed special effects in the upper layers.

In this hierarchical structure of the original special effects listed in the secondary conversion table, the top layer is special effect, followed below by transition and filter. Next below to the transition layer, Wipe and CrossFade are arranged. Next below to the Wipe layer, EdgeWipe and IrisWipe are arranged. Next below to the EdgeWipe layer, BarWipe and BoxWipe are arranged. Next below to the BarWipe layer, LeftToRight and TopToBottom are arranged. Next below to the BoxWipe layer, TopLeft, TopRight, BottomLeft, and BottomRight are arranged. On the other hand, next below the IrisWipe layer, IrisWipe is arranged, below which Rectangle and Diamond are arranged.

Next below to the filter layer, ColorConversion and PictureQualityConversion are arranged. Next below to the ColorConversion layer, GrayScale is arranged. Next below to the PictureQualityConversion layer, Sharpness is arranged. Namely, the input side of the secondary conversion table shown in FIG. 19 has the same hierarchical structure as that of the standard special effects shown in FIG. 17.

The following describes operations of the reproducing apparatus in the second embodiment. The operations other than the operation of S211 shown in FIG. 13 are substantially the same as those of the first embodiment, so that their descriptions will be skipped. The following describes the operations of the secondary conversion block 107 in the second embodiment, which is equivalent to S211.

Figure 20:
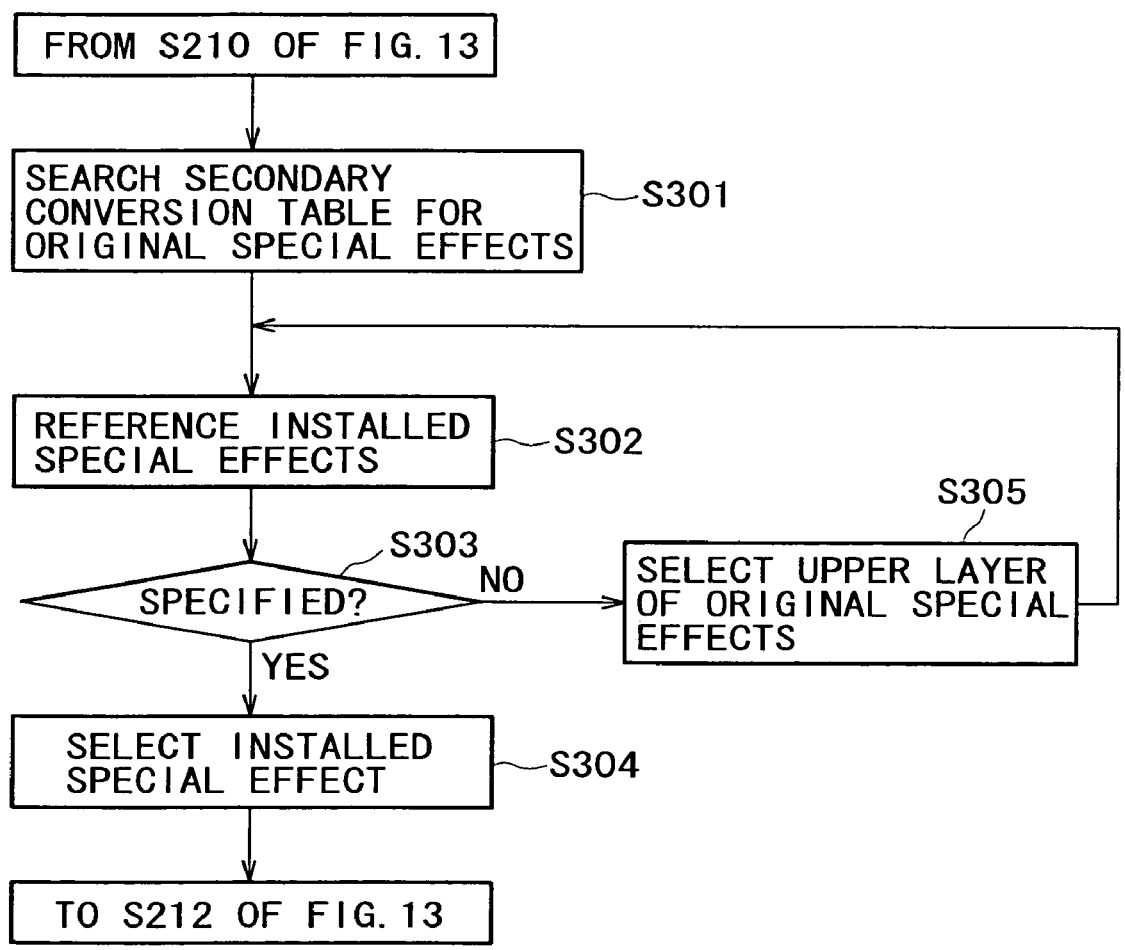
FIG. 20 is a flowchart describing operations of a secondary conversion block in the second embodiment.

Referring to FIG. 20, there is shown a flowchart describing operations of the secondary conversion block in the second embodiment.

In FIG. 20, the secondary conversion block 107 searches the secondary conversion table (FIG. 19) stored in the secondary conversion table storage block 104 for the primary conversion special effects outputted from the primary conversion block 106 (S301).

Next, the secondary conversion block 107 references the installed special effects corresponding to the primary conversion special effects (S302).

Next, as a result of the reference, the secondary conversion block 107 determines whether any installed special effect has been specified (S303).

If none of the installed special effects is specified by "-", the secondary conversion block 107 selects the upper layer of that primary conversion special effect, thereby providing a new primary conversion special effect (S305).

On the other hand, if an installed special effect is found specified, the secondary conversion block 107 selects the corresponding installed special effect as a secondary conversion special effect (S304) and then executes the processes of S212 and so on shown in FIG. 13.

The following specifically describes the operations of the secondary conversion block 107.

If the original special effect is IrisWipe for example, IrisWipe is secondary-converted into CrossFade without change because CrossFade is specified as the corresponding installed special effect.

If the original special effect is TopToBottom of BarWipe for example, the installed special effect corresponding to BarWipe on the upper layer of TopToBottom of BarWipe is referenced because the corresponding installed special effect is indicated by "−", namely not installed. As a result of the reference, the installed special effect corresponding to Bar-Wipe is also indicated by "−", namely not installed, so that the installed special effect corresponding to EdgeWipe on the upper layer of BarWipe is referenced. As a result of the reference, the installed special effect corresponding to EdgeWipe is also indicated by "−", namely not installed, so that the installed special effect corresponding to Wipe on the upper layer of EdgeWipe is referenced. As a result of the reference, the installed special effect corresponding to Wipe is also indicated by "−", namely not installed, so that the installed special effect corresponding to transition on the upper layer of Wipe is referenced. As a result of the reference, LeftToRight of BarWipe is specified as the installed special effect corresponding to transition, so that TopToBottom of BarWipe is secondary-converted into LeftToRight of BarWipe.

Thus, in the reproducing apparatus associated with the second embodiment, the special effects initially intended by the editor are converted by means of the primary conversion table and the secondary conversion table as required, so that video data may be reproduced by use of the special effects installed in this reproducing apparatus. In addition, in the reproducing apparatus associated with the second embodiment, both the primary conversion table and the second conversion table use a hierarchical structure in which the special effects are arranged in a hierarchical manner, so that the standard special effects need not always be assigned to all original special effects. It is always unnecessary to assign the alternative special effects to the standard special effects. Hence, the editor can assign standard special effects in a flexible manner and designers of reproducing apparatuses may assign alternative special effects in a flexible manner.

It should be noted that, in the first and second embodiments, Wipe is used for example among the special effects; it will be apparent that the present invention is applicable to any other special effects.

In the first and second embodiments, special effects are described; it will be apparent that the present invention is also applicable to character fonts. To be more specific, defining standard fonts and using a primary conversion table for converting original fonts of particular types into the standard fonts and a secondary conversion table for converting the standard fonts into the alternative fonts installed in each reproducing apparatus allow the reproducing apparatus to reproduce and display the fonts of text data regardless of the type and size of fonts initially specified in the text data.

As described and according to the invention, the edited video data are provided with a primary conversion table for converting editing codes into the type of standard editing standardized as a common standard, so that the original video data may be edited by use of various editing types regardless of the editing types installed in each reproducing apparatus, which reproduces the edited video data.

As described and according to the invention, there is no need to create edited video data in accordance with the difference between the models of reproducing apparatuses. This significantly reduces the cost of distribution and delivery of edited video data.

As described and according to the invention, even if the editing types initially intended by the editor are not installed in the reproducing apparatus, these types may be converted into standard editing types by use of the primary conversion table.

Further, even if the primary-converted standard editing types are not installed in the reproducing apparatus, these editing types may be secondary-converted into the installed editing types by use of the secondary conversion table. Hence, the installed editing types may be determined in a flexible manner without having to install not only any editing types but also any standard editing types.

The invention claimed is:

1. A reproducing apparatus for reading data from a recording medium storing original video data, edit data that is a collection of editing codes for performing editing with a desired editing type on a desired portion of said original video data, and a primary conversion table for correlating at least said editing type with an alternative editing type, performing editing on said original video data, and reproducing the edited video data, comprising:
 a primary conversion table storage block for storing said primary conversion table;
 a secondary conversion table storage block for storing a secondary conversion table that correlates said standard editing type with any of installed editing types;
 a primary conversion block for converting said editing type of said editing codes into a standard editing type corresponding to said editing type of said editing codes as a primary-conversion editing type by referencing said primary conversion table stored in said primary conversion table storage block when no editing type of said editing codes is installed; and
 a secondary conversion block for converting said primary conversion editing type into an installed editing type as a secondary conversion editing type by referencing said secondary conversion table stored in said secondary conversion table storage block when no primary conversion editing type obtained by said primary conversion block is installed,
 wherein said original video data are edited and reproduced by use of one of said editing type of said editing codes, said primary conversion editing type, and said secondary conversion editing type in accordance with said installed editing type.

2. The reproducing apparatus according to claim 1, wherein said secondary conversion table is created in a hierarchical manner in which said standard editing types are hierarchically classified based on the wideness of concept, and said secondary conversion block secondary-converts said installed editing type by a primary conversion editing type on an upper layer of said primary-conversion editing type, if there is no corresponding installed editing type in said secondary conversion table when secondary-converting said primary conversion editing.

* * * * *